United States Patent
Jiang et al.

(10) Patent No.: US 11,206,621 B2
(45) Date of Patent: Dec. 21, 2021

(54) METHOD AND DEVICE IN A NODE USED FOR WIRELESS COMMUNICATION

(71) Applicants: Qi Jiang, Shanghai (CN); XiaoBo Zhang, Shanghai (CN)

(72) Inventors: Qi Jiang, Shanghai (CN); XiaoBo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/777,904

(22) Filed: Jan. 31, 2020

(65) Prior Publication Data

US 2020/0252885 A1 Aug. 6, 2020

(30) Foreign Application Priority Data

Feb. 1, 2019 (CN) .......................... 201910104226.9

(51) Int. Cl.
*H04W 52/28* (2009.01)
(52) U.S. Cl.
CPC ............................... *H04W 52/283* (2013.01)
(58) Field of Classification Search
CPC . H04W 52/283; H04W 52/12; H04W 52/247; H04W 52/383
USPC ........................................................ 455/522
See application file for complete search history.

(56) References Cited

U.S. PATENT DOCUMENTS

| 2004/0152420 A1* | 8/2004 | Redi ..................... H04W 52/10 455/67.11 |
| 2011/0034204 A1* | 2/2011 | Sawai .................... H04W 16/14 455/522 |
| 2013/0137477 A1* | 5/2013 | Ozaki ................. H04W 52/367 455/522 |

(Continued)

FOREIGN PATENT DOCUMENTS

| CN | 102325365 A | 1/2012 |
| CN | 103139894 A | 6/2013 |

(Continued)

OTHER PUBLICATIONS

First Office Action received in application No. CN201910104226.9 dated Aug. 26, 2021.

(Continued)

*Primary Examiner* — Philip Sobutka

(57) ABSTRACT

The present disclosure discloses a method and a device in a node for wireless communication. A first node receives first information, the first information being used for determining a first parameter set, the first parameter set comprising K1 power parameters; and the transmits a first radio signal; a transmitting power value of the first radio signal is a first transmitting power value, a first power parameter is one of the K1 power parameters, the first power parameter is used for determining the first transmitting power value; information of a position of the first radio signal relative to the first node is used for determining the first power parameter out of the K1 power parameters. The present disclosure manages to associate arrival expected power or pathloss compensation factors on the PC5 link in V2X system with the distance between two terminals in communication with each other in V2X network.

16 Claims, 17 Drawing Sheets

(56) References Cited

U.S. PATENT DOCUMENTS

2013/0336120 A1* 12/2013 Bai .................. G08G 1/161
                                                    370/235
2018/0343626 A1* 11/2018 Li ................. H04W 72/0406

FOREIGN PATENT DOCUMENTS

CN        109219123  A    1/2019
WO        2017132825 A1   8/2017

OTHER PUBLICATIONS

First Search Report received in application No. CN201910104226.9 dated Aug. 19, 2021.

* cited by examiner

METHOD AND DEVICE IN A NODE USED FOR WIRELESS COMMUNICATION

CROSS REFERENCE TO RELATED APPLICATION

This application claims the priority benefit of Chinese Patent Application Serial Number CN201910104226.9, filed on Feb. 1, 2019, the full disclosure of which is incorporated herein by reference.

BACKGROUND

Technical Field

The present disclosure relates to transmission methods and devices in wireless communication systems, and in particular to a scheme and a device for power control in a V2X system.

Related Art

Application scenarios of future wireless communication systems are becoming increasingly diversified, and different application scenarios have different performance demands on systems. In order to meet different performance requirements of various application scenarios, it was decided at the 3rd Generation Partner Project (3GPP) Radio Access Network (RAN) #72 plenary session that a study on New Radio (NR), or what is called Fifth Generation (5G) shall be conducted. The work item of NR was approved at the 3GPP RAN #75 plenary session to standardize NR.

In response to rapidly growing Vehicle-to-Everything (V2X) business, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPP RAN #80 Plenary Session, the technical Study Item (SI) of NR V2X was initialized. Later at the first AdHoc conference of RANI 2019, it was agreed that the pathloss between a transmitter and a receiver in a V2X pair will be taken as reference when calculating the V2X transmitting power.

In the discussions in Rel-12/13/14 over Device to Device (D2D) and V2X, the transmitting power on sidelink is generally obtained based on a pathloss between a base station and a terminal, so as to ensure that radio signals transmitted on sidelink won't impact uplink receiving of the base station. In Rel-15, when it comes to NR-based V2X, interferences of radio signals between V2X links also need to be considered.

SUMMARY

According to the conclusion drawn at the first AdHoc conference of RANI 2019, when the transmitting power on sidelink is calculated based on a pathloss between a transmitter and a receiver in a V2X pair, sidelink communication between a pair of distant terminals may cause strong interference on sidelink communication between a pair of neighboring terminals. A simple way of addressing such difficulty is to orthogonalize two pairs of mutually interfering sidelink transmissions in time-frequency resources. However, employing the above method may lead to excess resources occupied by V2X transmission, and the method will not apply when the transmitter in V2X autonomously selects resources to be occupied in V2X transmission.

In view of the above problems, the present disclosure provides a solution. It should be noted that the embodiments in a User Equipment (UE) of the present disclosure and the characteristics in the embodiments may be applied to a base station of the present disclosure, and vice versa. The embodiments and the characteristics in the embodiments can be mutually combined if no conflict is incurred.

The present disclosure provides a method in a first-type communication node used for wireless communication, comprising:

receiving first information, the first information comprising a first parameter set, the first parameter set comprising K1 power parameters, the K1 being a positive integer greater than 1; and transmitting a first radio signal;

herein, a transmitting power value of the first radio signal is a first transmitting power value, a first power parameter is one of the K1 power parameters, the first power parameter is used for determining the first transmitting power value; a receiver of the first radio signal includes a second node, information of a position of the second node relative to the first node is used for determining the first power parameter out of the K1 power parameters.

In one embodiment, an advantage of the above method is that the first power parameter is used for determining an expected power of the first radio signal when arriving at the second node, thus connecting the expected power with the information of the position of the second node relative to the first node; therefore, it can be ensured that when the first node is far from the second node, the expected power is small; when the first node is near to the second node, the expected power is large; then the case that large transmitting power values on a pair of V2X links may interrupt transmissions on other V2X pairs can be avoided.

According to one aspect of the present disclosure, the above method is characterized in comprising:

receiving a second radio signal;

herein, the second radio signal is used for determining a first coefficient, the first coefficient is used for determining a first target power value; the first target power value is used for determining the first transmitting power value; the first target power value is linear with the first power parameter, or the first target power value is linear with a product of the first power parameter and the first coefficient.

In one embodiment, the essence of the above method lies in that the first coefficient is a pathloss between the second node and the first node.

According to one aspect of the present disclosure, the above method is characterized in comprising:

receiving a third radio signal; and transmitting a fourth radio signal;

herein, a transmitter of the third radio signal is a terminal other than the second node, and a receiver of the fourth radio signal includes the transmitter of the third radio signal; the third radio signal is used for determining a second coefficient, a transmitting power value of the fourth radio signal is a second transmitting power value, the second coefficient is used for determining the second transmitting power value; the first information comprises a first offset value, the first offset value and the first power parameter are used for determining the second transmitting power value.

In one embodiment, an advantage of the above method is that the first offset value is used for restricting the power value of the first node when transmitting a sidelink radio signal to a terminal other than the second node, so that a power value of the radio signal when arriving to the second node is no greater than a difference between the expected power value and the first offset value when the first node transmits a radio signal to a terminal other than the second node, thereby ensuring the receiving performance of the second node.

According to one aspect of the present disclosure, the above method is characterized in that the K1 power parameters respectively correspond to K1 distance zones, the information of the position of the second node relative to the first node is used for determining a given distance zone out of the K1 distance zones, the given distance zone is used for determining the first power parameter out of the K1 power parameters.

In one embodiment, an advantage of the above method is that different power parameters are configured for varying V2X transmission coverages; for V2X transmission covering large areas, the expected power attained at the receiver determined through a power parameter is smaller; for V2X transmission with limited coverage, the expected power attained at the receiver determined through a power parameter is larger; thus reducing transmission interferences between V2X pairs.

According to one aspect of the present disclosure, the above method is characterized in that a transmitter of the third radio signal is a third node, the first offset value is used for determining the second transmitting power value only when information of the position of the third node relative to the first node meets given conditions.

In one embodiment, an advantage of the above method is that since the utilization of the first offset value is restricted, the first offset value is only used when the third node and the first node are far from one another, the receiving performance of the third node is thus maintained while reducing interference with the second node.

According to one aspect of the present disclosure, the above method is characterized in comprising:
receiving second information;
herein, the second node transmits the second information, the second information comprises information relevant to a position of the second node, and the information relevant to the position of the second node is used for determining the information of the position of the second node relative to the first node.

In one embodiment, an advantage of the above method is that the information relevant to the position is used to determine the distance between the second node and the first node so as to improve precision.

According to one aspect of the present disclosure, the above method is characterized in comprising:
transmitting third information;
herein, the third information comprises first sub-information and second sub-information, the first sub-information is used for indicating the information of the position of the second node relative to the first node, while the second sub-information is used for indicating a first remaining power value, the first remaining power value is related to the information of the position of the second node relative to the first node.

In one embodiment, an advantage of the above method is that information of the position of the second node relative to the first node is reported, thereby enhancing the precision in implementation of the method in the present disclosure.

In one embodiment, another advantage of the above method is that the second sub-information is a Power Headroom Report (PHR) from the first node, and the PHR is related to positional information, which further improves PHR precision.

The present disclosure provides a method in a second node used for wireless communication, comprising:
transmitting first information, the first information comprising a first parameter set, the first parameter set comprising K1 power parameters, the K1 being a positive integer greater than 1; and
receiving a first radio signal;
herein, a transmitting power value of the first radio signal is a first transmitting power value, a first power parameter is one of the K1 power parameters, the first power parameter is used for determining the first transmitting power value; a transmitter of the first radio signal is a first node, information of a position of the second node relative to the first node is used for determining the first power parameter out of the K1 power parameters.

According to one aspect of the present disclosure, the above method is characterized in comprising:
transmitting a second radio signal;
herein, the second radio signal is used for determining a first coefficient, the first coefficient is used for determining a first target power value; the first target power value is used for determining the first transmitting power value; the first target power value is linear with the first power parameter, or the first target power value is linear with a product of the first power parameter and the first coefficient.

According to one aspect of the present disclosure, the above method is characterized in that the K1 power parameters respectively correspond to K1 distance zones, the information of the position of the second node relative to the first node is used for determining a given distance zone out of the K1 distance zones, the given distance zone is used for determining the first power parameter out of the K1 power parameters.

According to one aspect of the present disclosure, the above method is characterized in comprising:
transmitting second information;
herein, the second information comprises information relevant to a position of the second node, and the information relevant to the position of the second node is used for determining the information of the position of the second node relative to the first node.

According to one aspect of the present disclosure, the above method is characterized in comprising:
receiving third information;
herein, the third information comprises first sub-information and second sub-information, the first sub-information is used for indicating the information of the position of the second node relative to the first node, while the second sub-information is used for indicating a first remaining power value, the first remaining power value is related to the information of the position of the second node relative to the first node.

The present disclosure provides a method in a third node used for wireless communication, comprising:
transmitting a third radio signal; and
receiving a fourth radio signal;
herein, the third radio signal is used for determining a second coefficient, a transmitting power value of the fourth radio signal is a second transmitting power value, the second coefficient is used for determining the second transmitting power value; the first information in the present disclosure comprises a first offset value, the first offset value and the first power parameter in the present disclosure are used for determining the second transmitting power value; a receiver of the third radio signal includes the first node in the present disclosure, and the first node transmits the fourth radio signal.

According to one aspect of the present disclosure, the above method is characterized in that the first information in the present disclosure comprises a first parameter set, the first parameter set comprises K1 power parameters, the first power parameter is one of the K1 power parameters, information of a position of the second node in the present disclosure relative to a transmitter of the fourth radio signal is used for determining the first power parameter out of the K1 power parameters.

According to one aspect of the present disclosure, the above method is characterized in that the first information in the present disclosure comprises the first offset value, a transmitter of the first information is a node other than the third node.

According to one aspect of the present disclosure, the above method is characterized in that the K1 power parameters respectively correspond to K1 distance zones, information of the position of the second node relative to the transmitter of the fourth radio signal is used for determining a given distance zone out of the K1 distance zones, the given distance zone is used for determining the first power parameter out of the K1 power parameters.

According to one aspect of the present disclosure, the above method is characterized in that the first offset value is used for determining the second transmitting power value only when information of a position of the third node relative to the first node meets given conditions.

The present disclosure provides a method in a fourth node used for wireless communication, comprising:

transmitting first information, the first information comprising a first parameter set, the first parameter set comprising K1 power parameters, the K1 being a positive integer greater than 1;

herein, a transmitting power value of the first radio signal is a first transmitting power value, a first power parameter is one of the K1 power parameters, the first power parameter is used for determining the first transmitting power value; a transmitter of the first radio signal is a first node, information of a position of the second node relative to the first node is used for determining the first power parameter out of the K1 power parameters.

According to one aspect of the present disclosure, the above method is characterized in comprising:

receiving third information;

herein, the third information comprises first sub-information and second sub-information, the first sub-information is used for indicating the information of the position of the second node relative to the first node, while the second sub-information is used for indicating a first remaining power value, the first remaining power value is related to the information of the position of the second node relative to the first node.

According to one aspect of the present disclosure, the above method is characterized in that the fourth node is an attached base station for a serving cell of the first node in the present disclosure.

According to one aspect of the present disclosure, the above method is characterized in that the first information in the present disclosure comprises the first offset value, the first offset value and the first power parameter are used for determining a second transmitting power value; a transmitting power value of a fourth radio signal when transmitted by the first node is the second transmitting power value, a receiver of the fourth radio signal is the third node.

According to one aspect of the present disclosure, the above method is characterized in that the first offset value is used for determining the second transmitting power value only when information of a position of the third node relative to the first node meets given conditions.

According to one aspect of the present disclosure, the above method is characterized in that the K1 power parameters respectively correspond to K1 distance zones, the information of the position of the second node relative to the first node is used for determining a given distance zone out of the K1 distance zones, the given distance zone is used for determining the first power parameter out of the K1 power parameters.

The present disclosure provides a first node used for wireless communication, comprising:

a first receiver, which receives first information, the first information comprising a first parameter set, the first parameter set comprising K1 power parameters, the K1 being a positive integer greater than 1; and a first transmitter, which transmits a first radio signal;

herein, a transmitting power value of the first radio signal is a first transmitting power value, a first power parameter is one of the K1 power parameters, the first power parameter is used for determining the first transmitting power value; a receiver of the first radio signal includes a second node, information of a position of the second node relative to the first node is used for determining the first power parameter out of the K1 power parameters.

The present disclosure provides a second node used for wireless communication, comprising:

a second transmitter, which transmits first information, the first information comprising a first parameter set, the first parameter set comprising K1 power parameters, the K1 being a positive integer greater than 1;

a second receiver, which receives a first radio signal;

herein, a transmitting power value of the first radio signal is a first transmitting power value, a first power parameter is one of the K1 power parameters, the first power parameter is used for determining the first transmitting power value; a transmitter of the first radio signal is a first node, information of a position of the second node relative to the first node is used for determining the first power parameter out of the K1 power parameters.

The present disclosure provides a third node used for wireless communication, comprising:

a third transmitter, which transmits a third radio signal; and a third receiver, which receives a fourth radio signal;

herein, the third radio signal is used for determining a second coefficient, a transmitting power value of the fourth radio signal is a second transmitting power value, the second coefficient is used for determining the second transmitting power value; the first information in the present disclosure comprises a first offset value, the first offset value and the first power parameter in the present disclosure are used for determining the second transmitting power value; a receiver of the third radio signal includes the first node in the present disclosure, and the first node transmits the fourth radio signal.

The present disclosure provides a fourth node used for wireless communication, comprising:

a fourth transmitter, which transmits first information, the first information comprising a first parameter set, the first parameter set comprising K1 power parameters, the K1 being a positive integer greater than 1;

herein, a transmitting value of the first radio signal is a first transmitting power value, a first power parameter is one of the K1 power parameters, the first power parameter is used for determining the first transmitting power value; a transmitter of the first radio signal is a first node, and a receiver of the first radio signal includes a second node, information of the second node relative to the first node is used for determining the first power parameter out of the K1 power parameters.

In one embodiment, the present disclosure is advantageous over conventional schemes in the following aspects:

The first power parameter is used for determining an expected power of the first radio signal when arriving at the second node, thus connecting the expected power with the information of the position of the second node relative to the first node; in this way, it can be ensured that when the first node is far from the second node, the expected power is small; when the first node is near to the second node, the expected power is large; as a result, the case that large transmitting power values on a pair of V2X links may interrupt transmissions on other V2X pairs can be avoided.

The first offset value is used for restricting the power value of the first node when transmitting a sidelink radio signal to a terminal other than the second node; when the first node transmits a radio signal to a terminal other than the second node, a power value of the radio signal when arriving to the second node is no greater than a difference between the expected power value and the first offset value, thereby ensuring the receiving performance of the second node.

Different power parameters are configured for different V2X transmission coverages; for V2X transmission with extensive coverage, the expected power attained at the receiver determined through a power parameter is smaller; for V2X transmission with limited coverage, the expected power attained at the receiver determined through a power parameter is larger; thus reducing transmission interference between V2X pairs.

Restrictions are inflicted on the utilization of the first offset value, so that the first offset value is employed only when the third node is far from the first node, thereby reducing interference with the second node and maintaining the receiving performance of the third node.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
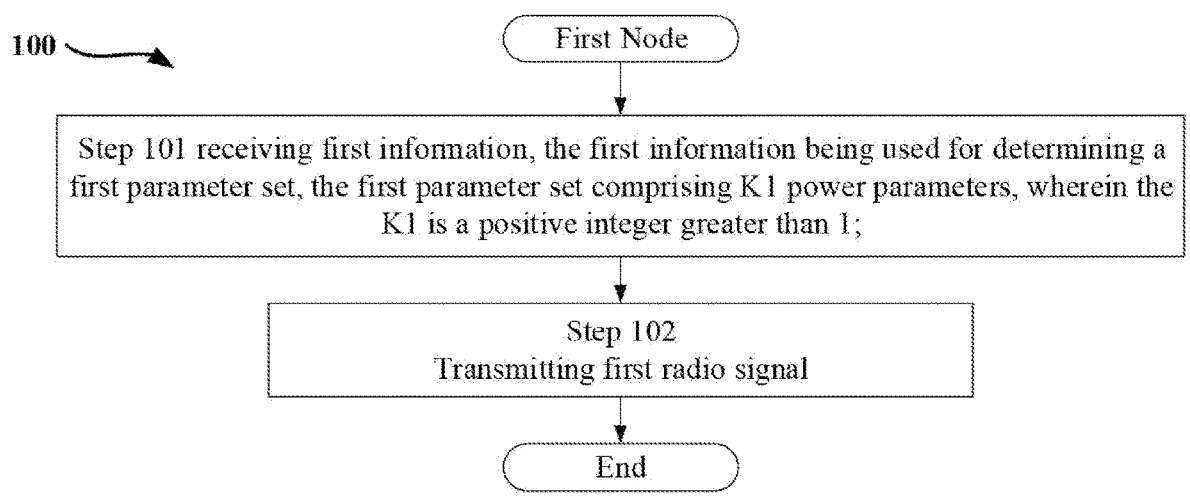
FIG. 1 illustrates a flowchart of processing of a first node according to one embodiment of the present disclosure.

Embodiment 1 illustrates a flowchart of processing of a first node, as shown in FIG. 1. In step 100 illustrated by FIG. 1, each box represents a step. In Embodiment 1, the first node in the present disclosure receives first information in step 101, the first information comprising a first parameter set, the first parameter set comprising K1 power parameters, the K1 being a positive integer; and then transmits a first radio signal in step 102.

In Embodiment 1, a transmitting power value of the first radio signal is a first transmitting power value, a first power parameter is one of the K1 power parameters, the first power parameter is used for determining the first transmitting power value; a receiver of the first radio signal includes a second node, information of a position of the second node relative to the first node is used for determining the first power parameter out of the K1 power parameters.

In one embodiment, the first information is transmitted via an air interface.

In one embodiment, the first node is a terminal.

In one embodiment, the second node is a terminal.

In one embodiment, the first node and the second node are both served by a base station.

In one embodiment, the first node and the second node are both within the coverage of a cell for a same base station.

In one embodiment, at least one of the first node or the second node is out of coverage.

In one embodiment, the first information is a higher layer signaling.

In one embodiment, the first information is a Radio Resource Control (RRC) signaling.

In one embodiment, the first information is cell-specific.

In one embodiment, the first information is terminal group-specific.

In one embodiment, a transmitter of the first information is a base station providing service to the first node.

In one embodiment, a transmitter of the first information is the second node.

In one embodiment, the information of the position of the second node relative to the first node is used for determining a zone identity, wherein the zone identity is used for determining the first power parameter out of the first parameter set.

In one embodiment, the information of the position of the second node relative to the first node is used for determining a distance zone, wherein the distance zone is used for determining the first power parameter out of the first parameter set.

In one embodiment, the information of the position of the second node relative to the first node is used for determining a first index, wherein the first index is used for determining the first power parameter out of the first parameter set.

In one embodiment, the first parameter set belongs to P0-PUSCH-AlphaSet in TS 38.331.

In one embodiment, the first parameter set belongs to PUSCH-PowerControl in TS 38.331.

In one embodiment, the first power parameter is measured in dBm, the first power parameter is a power value expected by the second node of the first radio signal when arriving at the second node.

In one embodiment, the first transmitting power value is a smaller one between $P_1$ and $P_{CMAX,V2X,k}$, the $P_{CMAX,V2X,k}$ is a maximum power value of the first node when transmitting the first radio signal, while the $P_1$ is determines by the formula below:

$$P_1 = 10 \log_{10}(2^\mu M_{RB}^{V2X}) + P_{1,V2X} + \alpha_1(j) PL_1(j)$$

Herein, the $P_{1,V2X}$ is the first power parameter, the $10 \log_{10}(2^\mu_{RB}{}^{V2X})$ is related to a number of Resource Blocks (RBs) occupied by the first radio signal in a frequency sub-band and a subcarrier spacing employed by the first radio signal, the $PL_1(j)$ is a pathloss between the second node and the first node, and the $\alpha_1(j)$ is a real number greater than 0 and no greater than 1.

In one embodiment, the $P_{1,V2X}$ changes with the distance between the second node and the first node.

In one embodiment, the $P_{1,V2X}$ decreases as the distance between the second node and the first node widens.

In one embodiment, the $P_{1,V2X}$ increases as the distance between the second node and the first node narrows.

In one embodiment, the first transmitting power value is a smaller one between $P_1$ and $P_{CMAX,V2X,k}$, wherein the $P_{CMAX,V2X,k}$ is a maximum power value of the first node when transmitting the first radio signal, while the $P_1$ is determined by the formula below:

$$P_1 = 10 \log_{10}(2^\mu M_{RB}^{V2X}) + P_{1,V2X} + \alpha_1(j) PL_1(j)$$

Herein, the $\alpha_1(j)$ is the first power parameter, the $10 \log_{10}(2^\mu M_{RB}^{V2X})$ is related to a number of RBs occupied by the first radio signal in a frequency sub-band and a subcarrier spacing employed by the first radio signal, the $PL_1(j)$ is a pathloss between the second node and the first node, the $\alpha_1(j)$ is a real number greater than 0 and no greater than 1, and the $P_{1,V2X}$ is a power value expected by the second node of the first radio signal when arriving at the second node.

In one embodiment, the $\alpha_1(j)$ changes with the distance between the second node and the first node.

In one embodiment, the $\alpha_1(j)$ decreases as the distance between the second node and the first node widens.

In one embodiment, the $\alpha_1(j)$ increases as the distance between the second node and the first node narrows.

In one embodiment, physical layer channel occupied by the first radio signal includes a Physical Sidelink Shared Channel (PSSCH).

In one embodiment, physical layer channel occupied by the first radio signal includes a Physical Sidelink Control Channel (PSCCH).

In one embodiment, physical layer channel occupied by the first radio signal includes a Physical Sidelink Discovery Channel (PSDCH).

In one embodiment, physical layer channel occupied by the first radio signal includes a Physical Sidelink Feedback Channel (PSFCH).

In one embodiment, the first power parameter is a real number greater than 0 and no greater than 1, the first power parameter is used for compensating for the pathloss from the second node to the first node.

In one embodiment, time-frequency resources occupied by the first radio signal belong to a first time-frequency resource set, the information of the position of the second node relative to the first node is used for determining the first time-frequency resource set.

In one embodiment, the information of the position of the second node relative to the first node is a distance zone, wherein the distance zone is used for determining the first power parameter.

In one subembodiment, the distance zone means that the distance between the second node and the first node is greater than X1 and no greater than X2, the X1 is a positive integer, and the X2 is a positive integer greater than the X1; the X1 and the X2 are both measured by meter (m).

In one subembodiment, the distance zone means that the pathloss between the second node and the first node is greater than Y1 and no greater than Y2, the Y1 is a real number greater than 0, and the Y2 is a real number greater than the Y1; the Y1 and the Y2 are both measured by dB.

In one embodiment, the second node is a Group Head.

In one embodiment, the second node is a Road Side Unit (RSU).

In one embodiment, the second node is a Group Manager.

In one embodiment, the first transmitting power value is measured in dBm.

In one embodiment, the first transmitting power value is measured in mW.

In one embodiment, the first power parameter is measured in mW.

Embodiment 2

Figure 2:
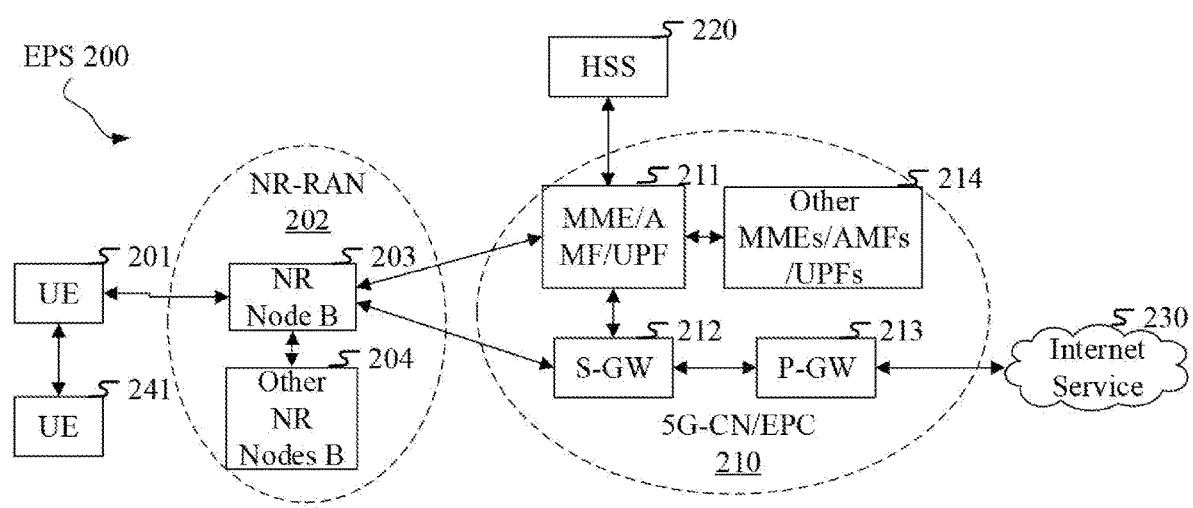
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE), and Long-Term Evolution Advanced (LTE-A) systems. The 5G NR or LTE network architecture 200 may be called an Evolved Packet System (EPS) 200 or other appropriate terminology. The EPS 200 may comprise one or more UEs 201, an NG-RAN 202, an Evolved Packet Core/5G-CoreNetwork (5G-CN/EPC) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be associated with other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, Non-terrestrial Base Station Communications, Satellite Mobile Communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, automobile, vehicle or some other appropriate terms. The gNB 203 is associated with the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is associated with the Internet Service 230. The Internet Service 230 comprises operator-compatible IP services, specifically including Internet, Intranet, IP Multimedia Subsystem (IMS) and Packet Switching Streaming Services (PSSs).

In one embodiment, the UE 201 corresponds to the first node in the present disclosure.

In one embodiment, the UE 241 corresponds to the second node in the present disclosure.

In one embodiment, the UE 241 corresponds to the third node in the present disclosure.

In one embodiment, the gNB 203 corresponds to the fourth node in the present disclosure.

In one embodiment, an air interface between the UE 201 and the gNB 203 is a Uu interface.

In one embodiment, an air interface between the UE 201 and the UE 241 is a PC5 interface.

In one embodiment, a radio link between the UE 201 and the gNB 203 is a cellular network link.

In one embodiment, a radio link between the UE 201 and the UE 241 is a sidelink.

In one embodiment, the first node in the present disclosure is the UE 201, and the second node in the present disclosure is a terminal within the coverage of the gNB 203.

In one embodiment, the first node in the present disclosure is the UE 201, and the second node in the present disclosure is a terminal out of the coverage of the gNB 203.

In one embodiment, the first node in the present disclosure is the UE 201, and the third node in the present disclosure is a terminal within the coverage of the gNB 203.

In one embodiment, the first node in the present disclosure is the UE 201, and the third node in the present disclosure is a terminal out of the coverage of the gNB 203.

In one embodiment, the first node, the second node and the third node in the present disclosure are all served by the gNB 203.

In one embodiment, the first node and the second node belong to a same terminal group.

In one embodiment, the first node and the third node belong to a same terminal group.

In one subembodiment of the above two embodiments, the second node and the third node belong to different terminal groups respectively.

In one embodiment, the first node is a car.

In one embodiment, the second node is a car.

In one embodiment, the third node is a car.

In one embodiment, the first node is a vehicle.

In one embodiment, the second node is a vehicle.

In one embodiment, the third node is a vehicle.

In one embodiment, the fourth node is a base station.

Embodiment 3

Figure 3:
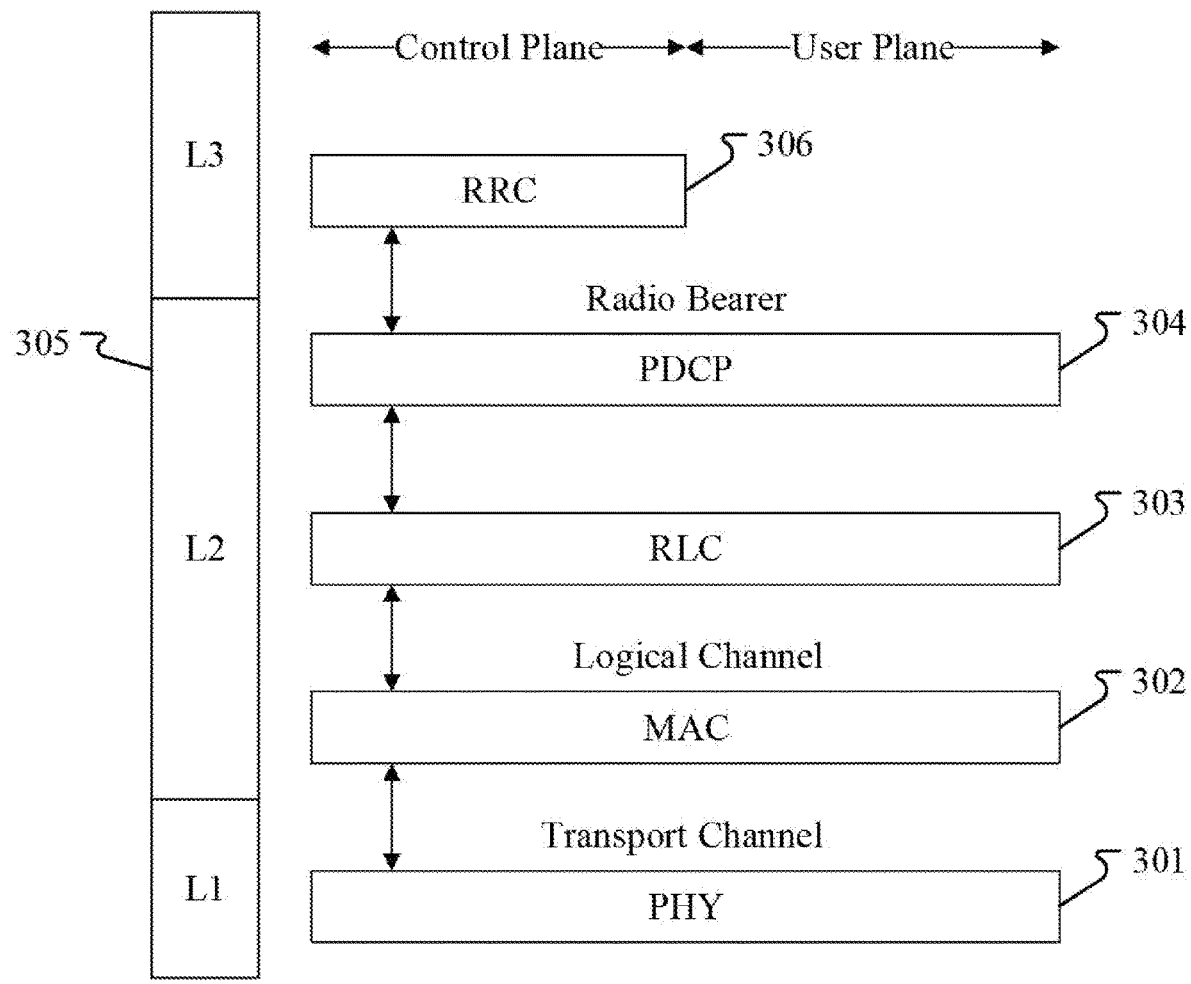
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to the present disclosure, as shown in FIG. 3. FIG. 3 is a schematic diagram illustrating a radio protocol architecture of a user plane and a control plane. In FIG. 3, the radio protocol architecture for a first node and a second node is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first node and the second node via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes of the network side. Although not described in FIG. 3, the first node may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for first node handover between second nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource blocks) in a cell. The MAC sublayer 302 is also in charge of HARQ operation. In the control plane, the radio protocol architecture of the first node and the second node is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the second node and the first node.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the radio protocol architecture in FIG. 3 is applicable to the fourth node in the present disclosure.

In one embodiment, the first information in the present disclosure is generated by the RRC sublayer 306.

In one embodiment, the first radio signal in the present disclosure is generated by the PHY 301.

In one embodiment, the first radio signal in the present disclosure is generated by the MAC sublayer 302.

In one embodiment, the second radio signal in the present disclosure is generated by the PHY 301.

In one embodiment, the third radio signal in the present disclosure is generated by the PHY 301.

In one embodiment, the fourth radio signal in the present disclosure is generated by the PHY 301.

In one embodiment, the fourth radio signal in the present disclosure is generated by the MAC sublayer 302.

In one embodiment, the second information in the present disclosure is generated by the RRC sublayer 306.

In one embodiment, the third information in the present disclosure is generated by the MAC sublayer 302.

Embodiment 4

Figure 4:
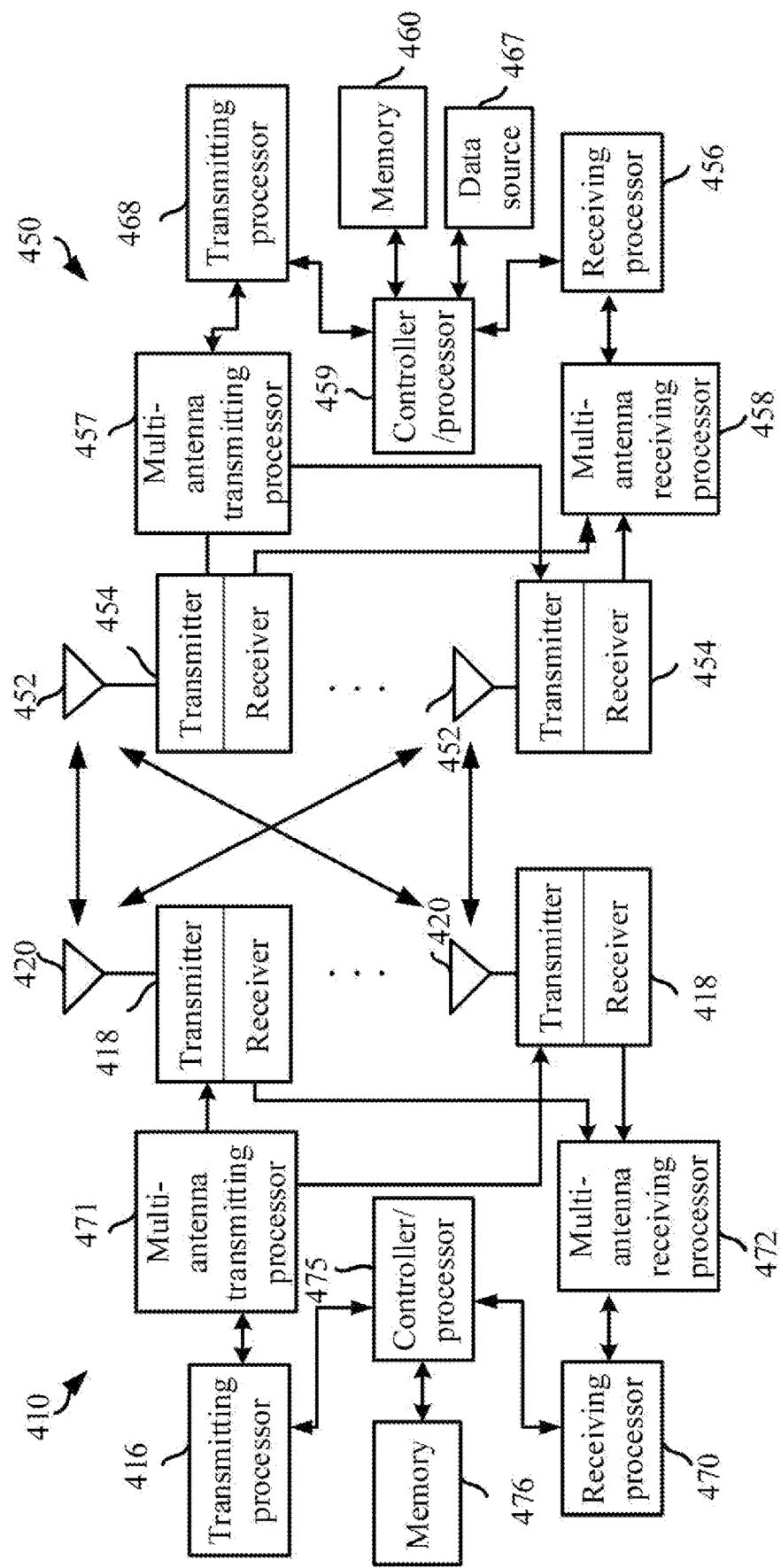
FIG. 4 illustrates a schematic diagram of a first communication device and a second communication device according to one embodiment of the present disclosure.

Embodiment 4 illustrates a schematic diagram of a first communication device and a second communication device, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 implements the functionality of the L2 layer. The controller/processor 475 provides header compression, encryption, packet segmentation and reordering, and multiplexing between a logical channel and a transport channel, and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In a transmission between the second communication device 410 and the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission between the first communication device 450 and the second communication device 410, the controller/processor 475 provides de-multiplexing between a transport channel and a logical channel, packet reassembling, decrypting, header decompression, control signal processing so as to recover a higher-layer packet from the first communication device 450. The higher-layer packet coming from the controller/processor 475 may be provided to the core network.

In one embodiment, the first communication device 450 comprises at least one processor and at least one memory. The at least one memory includes computer program codes. The at least one memory and the computer program codes are configured to be used in collaboration with the at least one processor. The first communication device 450 at least receives first information, the first information comprising a first parameter set, the first parameter set comprising K1 power parameters, the K1 being a positive integer greater than 1; and transmits a first radio signal; a transmitting power value of the first radio signal is a first transmitting power value, a first power parameter is one of the K1 power parameters, the first power parameter is used for determining the first transmitting power value; a receiver of the first radio signal includes a second node, information of a position of the second node relative to the first node is used for determining the first power parameter out of the K1 power parameters.

In one embodiment, the first communication device 450 comprises a memory that stores a computer readable instruction program. The computer readable instruction program generates an action when executed by at least one processor. The action includes: receiving first information, the first information comprising a first parameter set, the first parameter set comprising K1 power parameters, the K1 being a positive integer greater than 1; and transmitting a first radio signal; a transmitting power value of the first radio signal is a first transmitting power value, a first power parameter is one of the K1 power parameters, the first power parameter is used for determining the first transmitting power value; a receiver of the first radio signal includes a second node, information of a position of the second node relative to the first node is used for determining the first power parameter out of the K1 power parameters.

In one embodiment, the second communication device 410 comprises at least one processor and at least one memory. The at least one memory includes computer program codes. The at least one memory and the computer program codes are configured to be used in collaboration with the at least one processor. The second communication device 410 at least transmits first information, the first information comprising a first parameter set, the first parameter set comprising K1 power parameters, the K1 being a positive integer greater than 1; and receives a first radio signal; a transmitting power value of the first radio signal is a first transmitting power value, a first power parameter is one of the K1 power parameters, the first power parameter is used for determining the first transmitting power value; a transmitter of the first radio signal is a first node, information of a position of the second node relative to the first node is used for determining the first power parameter out of the K1 power parameters.

In one embodiment, the second communication device 410 comprises a memory that stores a computer readable instruction program. The computer readable instruction program generates an action when executed by at least one processor. The action includes: transmitting first information, the first information comprising a first parameter set, the first parameter set comprising K1 power parameters, the K1 being a positive integer greater than 1; and receiving a first radio signal; a transmitting power value of the first radio signal is a first transmitting power value, a first power parameter is one of the K1 power parameters, the first power parameter is used for determining the first transmitting power value; a transmitter of the first radio signal is a first node, information of a position of the second node relative to the first node is used for determining the first power parameter out of the K1 power parameters.

In one embodiment, the second communication device 410 comprises at least one processor and at least one memory. The at least one memory includes computer program codes. The at least one memory and the computer program codes are configured to be used in collaboration with the at least one processor. The second communication device 410 at least transmits a third radio signal, and receives a fourth radio signal; the third radio signal is used for determining a second coefficient, a transmitting power value of the fourth radio signal is a second transmitting power value, the second coefficient is used for determining the second transmitting power value; the first information comprises a first offset value, the first offset value and the first power parameter are used for determining the second transmitting power value; a receiver of the third radio signal includes the first node in the present disclosure, and the first node transmits the fourth radio signal.

In one embodiment, the second communication device 410 comprises a memory that stores a computer readable instruction program. The computer readable instruction program generates an action when executed by at least one processor. The action includes: transmitting a third radio signal, and receiving a fourth radio signal; the third radio signal is used for determining a second coefficient, a transmitting power value of the fourth radio signal is a second transmitting power value, the second coefficient is used for determining the second transmitting power value; the first information comprises a first offset value, the first offset value and the first power parameter are used for determining the second transmitting power value; a receiver of the third radio signal includes the first node in the present disclosure, and the first node transmits the fourth radio signal.

In one embodiment, the second communication device 410 comprises at least one processor and at least one memory. The at least one memory includes computer program codes. The at least one memory and the computer program codes are configured to be used in collaboration with the at least one processor. The second communication device 410 at least transmits first information, the first information comprising a first parameter set, the first parameter set comprising K1 power parameters, the K1 being a positive integer greater than 1; a transmitting power value of the first radio signal is a first transmitting power value, a first power parameter is one of the K1 power parameters, the first power parameter is used for determining the first transmitting power value; a transmitter of the first radio signal is a first node, and a receiver of the first radio signal includes a second node, information of a position of the second node relative to the first node is used for determining the first power parameter out of the K1 power parameters.

In one embodiment, the second communication device 410 comprises a memory that stores a computer readable instruction program. The computer readable instruction program generates an action when executed by at least one processor. The action includes: transmitting first information, the first information comprising a first parameter set, the first parameter set comprising K1 power parameters, the K1 being a positive integer greater than 1; a transmitting power value of the first radio signal is a first transmitting power value, a first power parameter is one of the K1 power parameters, the first power parameter is used for determining the first transmitting power value; a transmitter of the first radio signal is a first node, and a receiver of the first radio signal includes a second node, information of a position of the second node relative to the first node is used for determining the first power parameter out of the K1 power parameters.

In one embodiment, the first communication device 450 corresponds to the first node in the present disclosure.

In one embodiment, the second communication device 410 corresponds to the second node in the present disclosure.

In one embodiment, the second communication device 410 corresponds to the third node in the present disclosure.

In one embodiment, the second communication device 410 corresponds to the fourth node in the present disclosure.

In one embodiment, the first communication device 450 is a UE.

In one embodiment, the second communication device 410 is a UE.

In one embodiment, the second communication device 410 is a base station.

In one embodiment, at least one of the antenna 452, the receiver 454, the multi-antenna receiving processor 458, the receiving processor 456 or the controller/processor 459 is used for receiving first information; at least one of the antenna 420, the transmitter 418, the multi-antenna transmitting processor 471, the transmitting processor 416 or the controller/processor 475 is used for transmitting first information.

In one embodiment, at least one of the antenna 452, the transmitter 454, the multi-antenna transmitting processor 457, the transmitting processor 468 or the controller/processor 459 is used for transmitting a first radio signal; at least one of the antenna 420, the receiver 418, the multi-antenna receiving processor 472, the receiving processor 470 or the controller/processor 475 is used for receiving the first radio signal.

In one embodiment, at least one of the antenna 452, the receiver 454, the multi-antenna receiving processor 458, the receiving processor 456 or the controller/processor 459 is used for receiving a second radio signal; at least one of the antenna 420, the transmitter 418, the multi-antenna transmitting processor 471, the transmitting processor 416 or the controller/processor 475 is used for transmitting the second radio signal.

In one embodiment, at least one of the antenna 452, the receiver 454, the multi-antenna receiving processor 458, the receiving processor 456 or the controller/processor 459 is used for receiving a third radio signal; at least one of the antenna 420, the transmitter 418, the multi-antenna transmitting processor 471, the transmitting processor 416 or the controller/processor 475 is used for transmitting the third radio signal.

In one embodiment, at least one of the antenna 452, the transmitter 454, the multi-antenna transmitting processor 457, the transmitting processor 468 or the controller/processor 459 is used for transmitting a fourth radio signal; at least one of the antenna 420, the receiver 418, the multi-antenna receiving processor 472, the receiving processor 470 or the controller/processor 475 is used for receiving the fourth radio signal.

In one embodiment, at least one of the antenna 452, the receiver 454, the multi-antenna receiving processor 458, the receiving processor 456 or the controller/processor 459 is used for receiving second information; at least one of the antenna 420, the transmitter 418, the multi-antenna transmitting processor 471, the transmitting processor 416 or the controller/processor 475 is used for transmitting second information.

In one embodiment, at least one of antenna 452, the transmitter 454, the multi-antenna transmitting processor 457, the transmitting processor 468 or the controller/processor 459 is used for transmitting third information; at least one of the antenna 420, the receiver 418, the multi-antenna receiving processor 472, the receiving processor 470 or the controller/processor 475 is used for receiving third information.

Embodiment 5

Figure 5:
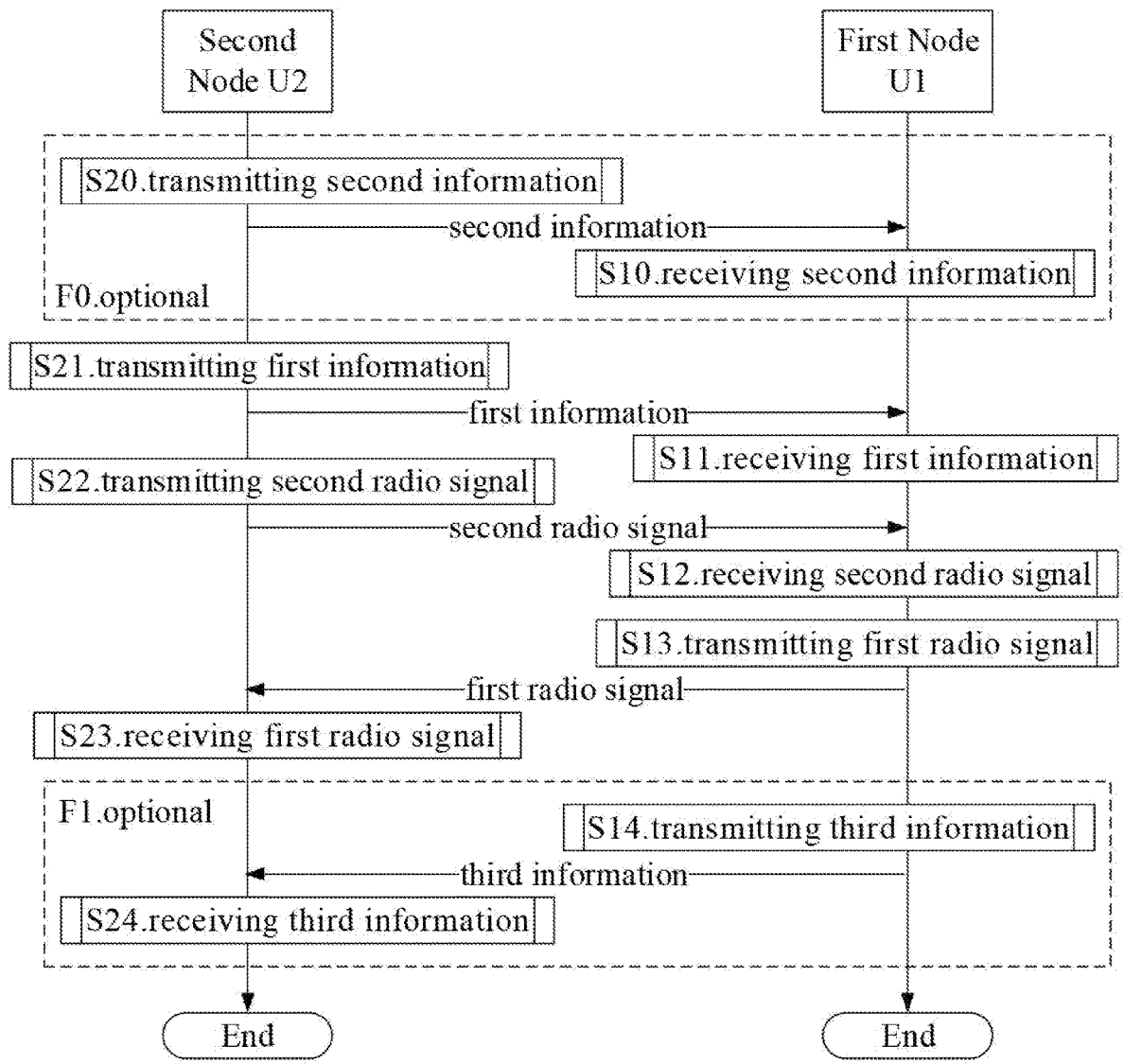
FIG. 5 illustrates a flowchart of a first radio signal according to one embodiment of the present disclosure.

Embodiment 5 illustrates a flowchart of a first radio signal, as shown in FIG. 5. In FIG. 5, communication between a first node U1 and a second node U2 is via an air interface. Steps in box F0 and box F1 in FIG. 5 are optional.

The first node U1 receives second information in step S10, receives first information in step S11, receives a second radio signal in step S12, transmits a first radio signal in step S13, and transmits third information in step S14.

The second node U2 transmits second information in step S20, transmits first information in step S21, transmits a second radio signal in step S22, receives a first radio signal in step S23, and receives third information in step S24.

In Embodiment 5, the first information comprises a first parameter set, the first parameter set comprises K1 power parameters, the K1 is a positive integer greater than 1; a transmitting power value of the first radio signal is a first transmitting power value, a first power parameter is one of the K1 power parameters, the first power parameter is used for determining the first transmitting power value; information of a position of the second node U2 relative to the first node U1 is used for determining the first power parameter out of the K1 power parameters; the second radio signal is used for determining a first coefficient, the first coefficient is used for determining the first target power value; the first target power value is used for determining the first transmitting power value; the first target power value is linear with the first power parameter, or the first target power value is linear with a product of the first power parameter and the first coefficient; the K1 power parameters respectively correspond to K1 distance zones, the information of the position of the second node U2 relative to the first node U1 is used for determining a given distance zone out of the K1 distance zones, the given distance zone is used for determining the first power parameter out of the K1 power parameters; the second information comprises information relevant to a position of the second node U2, the information relevant to the position of the second node U2 is used for determining the information of the position of the second node U2 relative to the first node U1; the third information comprises first sub-information and second sub-information, the first sub-information is used for indicating the information of the position of the second node U2 relative to the first node U1, while the second sub-information is used for indicating a first remaining power value, the first remaining power value is related to the information of the position of the second node U2 relative to the first node U1.

In one embodiment, physical layer channel occupied by the second radio signal includes at least one of Primary Sidelink Synchronization Signal (PSSS) or a Secondary Sidelink Synchronization Signal (SSSS).

In one embodiment, physical layer channel occupied by the second radio signal includes a PSCCH.

In one embodiment, physical layer channel occupied by the second radio signal includes a PSSCH.

In one embodiment, physical layer channel occupied by the second radio signal includes a PSDCH.

In one embodiment, the first coefficient is a pathloss from the second node U2 to the first node U1.

In one embodiment, the first transmitting power value is a smaller one between the first target power value and $P_{CMAX,V2X,k}$, wherein the $P_{CMAX,V2X,k}$ is a maximum power value of the first node U1 when transmitting the first radio signal.

In one embodiment, the first target power value corresponds to the $P_1$ in the present disclosure.

In one embodiment, the first target power value is measured in dBm.

In one embodiment, the first power parameter is measured in dBm, and the first target power value is linear with the first power parameter.

In one embodiment, the first power parameter is a real number greater than 0 and no greater than 1, the first target power value is linear with a product of the first power parameter and the first coefficient.

In one embodiment, the first coefficient is a pathloss between the second node U2 and the first node U1.

In one embodiment, the K1 distance zones respectively correspond to K1 first-type indices.

In one embodiment, the information of the position of the second node U2 relative to the first node U1 is used for determining a first index out of the K1 first-type indices.

In one embodiment, the K1 power parameters are respectively K1 first-type power values, the given distance zone is used for determining a first index out of the K1 first-type indices, the first index is used for determining a first power value out of the K1 first-type power values; the first power value is a power value expected by the second node U2 of the first radio signal when arriving at the second node U2; the first power value is equal to the first power parameter in the present disclosure.

In one embodiment, the K1 power parameters are respectively K1 first-type compensation factors, the given distance zone is used for determining a first index out of the K1 first-type indices, the first index is used for determining a first compensation factor out of the K1 first-type compensation factors; a product of the first compensation factor and the pathloss from the second node U2 to the first node U1 is used for determining the first transmitting power value; the first compensation factor is equal to the first power parameter in the present disclosure.

In one embodiment, the $P_1$ in the present disclosure is determined by the formula below:

$$P_1 = 10 \log_{10}(2^{\mu} M_{RB}^{V2X}) + P_{1,V2X}(k) + \alpha_1(j) PL_1(j)$$

Herein, the $P_{1,V2X}(k)$ is the first power parameter, and k placed in parentheses is equal to the first index.

In one embodiment, the $P_1$ in the present disclosure is determined by the formula below:

$$P_1 = 10 \log_{10}(2^{\mu} M_{RB}^{V2X}) + P_{1,V2X} + \alpha_1(j,k) PL_1(j)$$

Herein, the $\alpha_1(j,k)$ is the first power parameter, and k placed in parentheses is equal to the first index.

In one embodiment, the K1 distance zones are illustrated by the table below, wherein the S represents the distance between the second node U2 and the first node U1, the k is a positive integer greater than 1 and no greater than K1; the S is located between $X_{L,k}$ and $X_{H,k}$, the first power parameter is equal to $P_{1,V2X}(k)$.

| | |
|---|---|
| $X_{L,1} < S \leq X_{H,1}$ | $P_{1,V2X}(1)$ |
| ... | ... |
| $X_{L,k} < S \leq X_{H,k}$ | $P_{1,V2X}(k)$ |
| ... | ... |
| $X_{L,K1} < S \leq X_{H,K1}$ | $P_{1,V2X}(K1)$ |

In one embodiment, the K1 distance zones are illustrated by the table below, wherein the S represents the distance between the second node U2 and the first node U1, the k is a positive integer greater than 1 and no greater than K1; the S is located between $X_{L,k}$ and $X_{H,k}$, the first power parameter is equal to $\alpha_1(j,k)$.

| | |
|---|---|
| $X_{L,1} < S \leq X_{H,1}$ | $\alpha_1(j, 1)$ |
| ... | ... |
| $X_{L,k} < S \leq X_{H,k}$ | $\alpha_1(j, k)$ |
| ... | ... |
| $X_{L,K1} < S \leq X_{H,K1}$ | $\alpha_1(j, K1)$ |

In one embodiment, the second information comprises a zone identity of the second node U2.

In one embodiment, the first node determines the information of the position of the second node U2 relative to the first node U1 according to a zone identity of the first node U1 and a zone identity of the second node U2.

In one embodiment, the second information comprises both longitude and latitude of the position of the second node U2.

In one embodiment, the first node U1 determines the information of the position of the second node U2 relative to the first node U1 according to longitude and latitude of the first node U1 and longitude and latitude of the second node U2.

In one embodiment, physical layer channel carrying the second information includes a Physical Sidelink Broadcast Channel (PSBCH).

In one embodiment, physical layer channel carrying the second information includes a PSDCH.

In one embodiment, physical layer channel carrying the second information includes a PSSCH.

In one embodiment, the first sub-information is used for indicating the first index in the present disclosure.

In one embodiment, the phrase that the first remaining power value is related to the information of the position of the second node U2 relative to the first node U1 means that the first remaining power value is equal to a difference between a first maximum power value and the first transmitting power value, the first maximum power value is related to the information of the position of the second node U2 relative to the first node U1.

In one embodiment, the phrase that the first remaining power value is related to the information of the position of the second node U2 relative to the first node U1 means that the first remaining power value is equal to a difference between a first maximum power value and the first transmitting power value, the first transmitting power value is related to the information of the position of the second node U2 relative to the first node U1.

In one embodiment, the first remaining power value is a Power Headroom.

In one embodiment, the first transmitting power value is used for determining the first remaining power value.

In one embodiment, the first transmitting power value and the second transmitting power value in the present disclosure are used for determining the first remaining power value.

Embodiment 6

Figure 6:
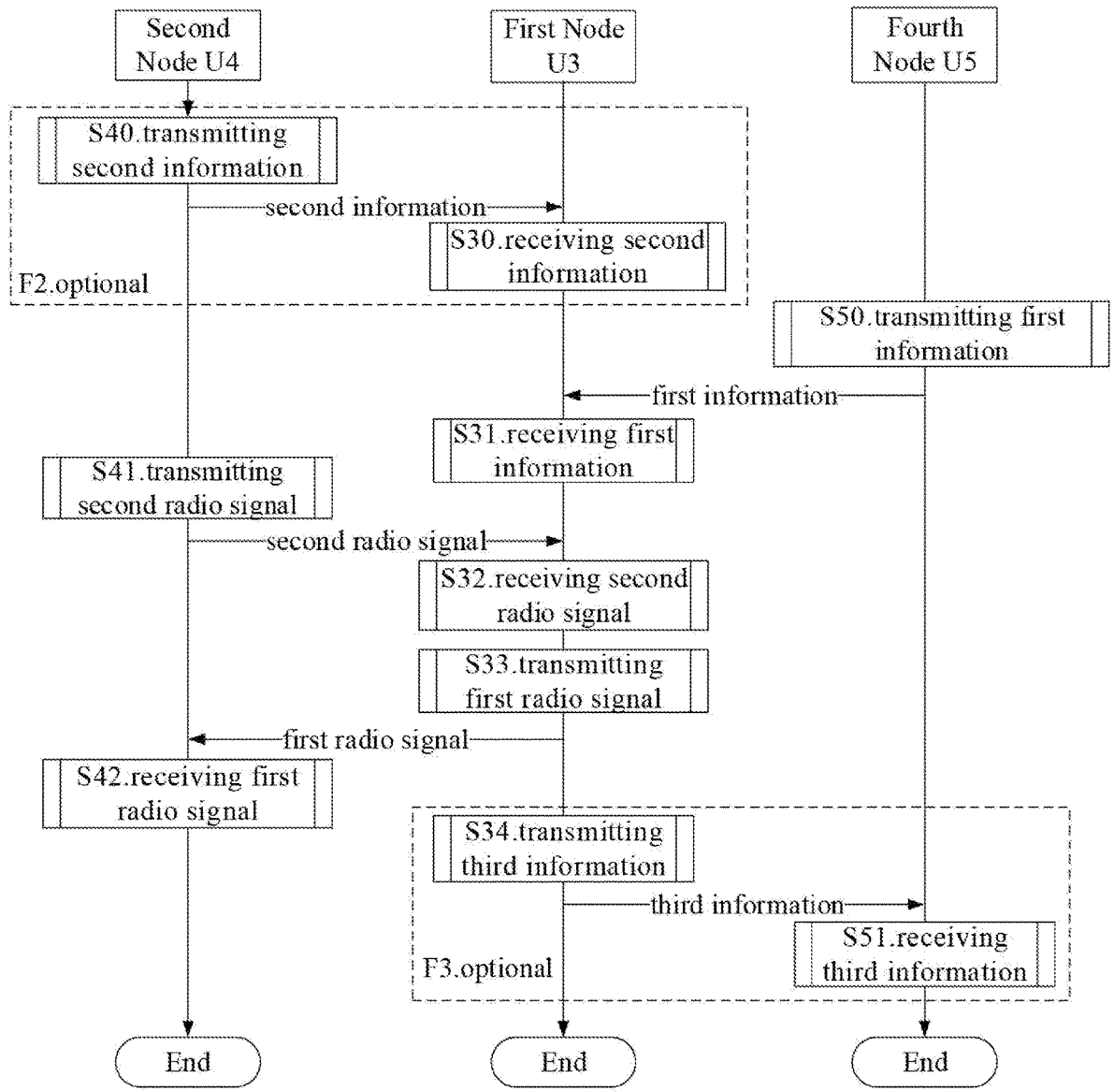
FIG. 6 illustrates a flowchart of a first radio signal according to another embodiment of the present disclosure.

Embodiment 6 illustrates another flowchart of a first radio signal, as shown in FIG. 6. In FIG. 6, any two nodes of a first node U3, a second node U4 and a fourth node U5 are in communication with each other via an air interface. Steps marked by box F2 and box F3 are optional; embodiments and subembodiments in FIG. 5 can be applied to Embodiment 6 when no conflict is incurred.

The first node U3 receives second information in step S30, receives first information in step S31; receives a second radio signal in step S32, transmits a first radio signal in step S33, and transmits third information in step S34.

The second node U4 transmits second information in step S40, transmits a second radio signal in step S41, and receives a first radio signal in step S42.

The fourth node U5 transmits first information in step S50, and receives third information in step S51.

In Embodiment 6, the first information comprises a first parameter set, the first information comprising a first parameter set, the first parameter set comprising K1 power parameters, the K1 being a positive integer greater than 1; a transmitting power value of the first radio signal is a first transmitting power value, a first power parameter is one of the K1 power parameters, the first power parameter is used for determining the first transmitting power value; information of a position of the second node U4 relative to the first node U3 is used for determining the first power parameter out of the K1 power parameters; the second radio signal is used for determining a first coefficient, the first coefficient is used for determining the first target power value; the first target power value is used for determining the first transmitting power value; the first target power value is linear with the first power parameter, or the first target power value is linear with a product of the first power parameter and the first coefficient; the K1 power parameters respectively correspond to K1 distance zones, the information of the position of the second node U4 relative to the first node U3 is used for determining a given distance zone out of the K1 distance zones, the given distance zone is used for determining the first power parameter out of the K1 power parameters; the second information comprises information relevant to a position of the second node U4, the information relevant to the position of the second node U4 is used for determining the information of the position of the second node U4 relative to the first node U3; the third information comprises first sub-information and second sub-information, the first sub-information is used for indicating the information of the position of the second node U4 relative to the first node U3, while the second sub-information is used for indicating a first remaining power value, the first remaining power value is related to the information of the position of the second node U4 relative to the first node U3.

Embodiment 7

Figure 7:
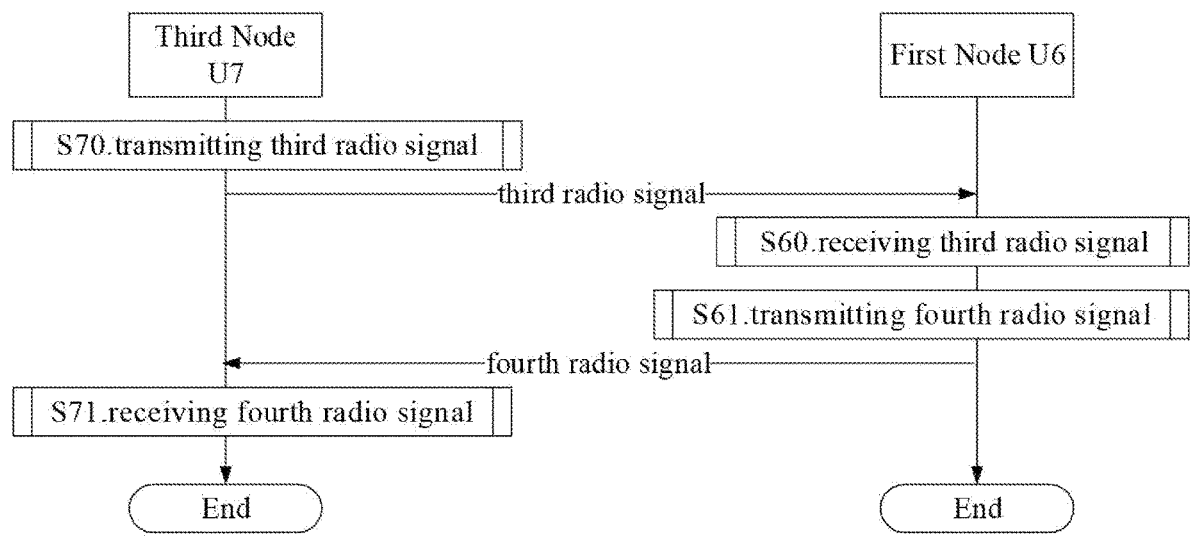
FIG. 7 illustrates a flowchart of a fourth radio signal according to one embodiment of the present disclosure.

Embodiment 7 illustrates a flowchart of a fourth radio signal, as shown in FIG. 7. In FIG. 7, a first node U6 and a third node U7 are in communication via an air interface. Embodiments and subembodiments in Embodiment 5 can be applied to Embodiment 7 when no conflict is incurred, and embodiments and subembodiments in Embodiment 6 can also be applied to Embodiment 7 when there is not conflict.

The first node U6 receives a third radio signal in step S60, and transmits a fourth radio signal in step S61.

The third node U7 transmits a third radio signal in step S70, and receives a fourth radio signal in step S71.

In Embodiment 7, the third radio signal is used for determining a second coefficient, a transmitting power value of the fourth radio signal is a second transmitting power value, the second coefficient is used for determining the second transmitting power value; the first information in the present disclosure comprises a first offset value, the first offset value and the first power parameter in the present disclosure are used for determining the second transmitting power value.

In one embodiment, the first information in the present disclosure comprises a first parameter set, the first parameter set comprising K1 power parameters, the K1 being a positive integer greater than 1; information of the position of the second node in the present disclosure relative to the first node U6 is used for determining the first power parameter out of the K1 power parameters.

In one embodiment, the first information in the present disclosure comprises the first offset value, a transmitter of the first information is a node other than the third node U7.

In one embodiment, the K1 power parameters respectively correspond to K1 distance zones, the information of the position of the second node in the present disclosure relative to the first node U6 is used for determining a given distance zone out of the K1 distance zones, the given distance zone is used for determining the first power parameter out of the K1 power parameters.

In one embodiment, the first offset value is used for determining the second transmitting power value only when information of a position of the third node U7 relative to the first node U6 meets given conditions.

In one subembodiment, the phrase that the first offset value is used for determining the second transmitting power value only when information of a position of the third node U7 relative to the first node U6 meets given conditions means that: the first offset value is not used for determining the second transmitting power value when the information of the position of the third node U7 relative to the first node U6 fail to meet given conditions.

In one subembodiment, the phrase that the first offset value is used for determining the second transmitting power value only when information of a position of the third node U7 relative to the first node U6 meets given conditions means that: the first offset value is equal to 0 when the information of the position of the third node U7 relative to the first node U6 fail to meet given conditions.

In one subembodiment, the phrase that information of a position of the third node U7 relative to the first node U6 meets given conditions includes: a distance between the third node U7 and the first node U6 is larger than a first threshold.

In one embodiment, the phrase that information of a position of the third node U7 relative to the first node U6 meets given conditions includes: a pathloss between the third node U7 and the first node U6 is greater than a second threshold.

In one subembodiment of the above embodiment, the second threshold is fixed, or the second threshold is configured by a higher layer signaling.

In one subembodiment of the above embodiment, the second threshold is measured in dB.

In one embodiment, the phrase that information of a position of the third node U7 relative to the first node U6 meets given conditions includes: the information of the position of the third node U7 relative to the first node U6 corresponds to the first index in the present disclosure, the first index is greater than a third threshold.

In one subembodiment, the third threshold is fixed, or the third threshold is configured by a higher layer signaling.

In one subembodiment, the third threshold is a positive integer not less than 1 and no greater than the K1.

In one embodiment, physical layer channels occupied by the third radio signal include at least one of a PSSS or an SSSS.

In one embodiment, physical layer channel occupied by the third radio signal includes a PSCCH.

In one embodiment, physical layer channel occupied by the third radio signal includes a PSSCH.

In one embodiment, physical layer channel occupied by the third radio signal includes a PSDCH.

In one embodiment, physical layer channel occupied by the fourth radio signal includes a PSCCH.

In one embodiment, physical layer channel occupied by the fourth radio signal includes a PSSCH.

In one embodiment, physical layer channel occupied by the fourth radio signal includes a PSDCH.

In one embodiment, physical layer channel occupied by the fourth radio signal includes a PSFCH.

In one embodiment, the first offset is a real number no greater than 0.

In one embodiment, a sum of the first power parameter and the first offset value is equal to a power value expected by the second node in the present disclosure of the fourth radio signal when arriving at the second node.

In one embodiment, the first offset is a real number no less than 0.

In one embodiment, a difference between the first power parameter and the first offset value is equal to a power value expected by the second node in the present disclosure of the fourth radio signal when arriving at the second node.

In one embodiment, the second coefficient is a pathloss from the third node U7 to the first node U6.

In one embodiment, the second transmitting power value is a smaller one between $P_2$ and $P_{CMAX,V2X,k}$, the $P_{CMAX,V2X,k}$ is a maximum power value of the first node when transmitting the fourth radio signal, the $P_2$ is determined by the formula below:

$$P_2 = 10\log_{10}(2^{\mu}M_{RB}^{V2X}) + P_{2,V2X} + \alpha_2(j)PL_2(j)$$

Herein, the $P_{2,V2X}$ is described as the following formula:

$$P_{2,V2X} = P_{1,V2X} + P_{1,offset} + PL_1(j) - \alpha_2(j)PL_2(j)$$

Herein, the $PL_2(j)$ is a pathloss from the third node U7 to the first node U6, that is, a second parameter in the present disclosure, the $\alpha_2(j)$ is compensation for the second parameter, and the $\alpha_2(j)$ is a real number greater than 0 and no greater than 1; the $PL_1(j)$ is a pathloss from the second node to the first node U6, the $P_{1,V2X}$ is the first power parameter in the present disclosure, the $P_{1,offset}$ is the first offset value, the $10\log_{10}(2^{\mu}M_{RB}^{V2X})$ is related to a number of RBs occupied by the fourth radio signal in a frequency sub-band and a subcarrier spacing employed by the fourth radio signal.

In one embodiment, the $P_{1,V2X}$ is configured to the first node U6 by the second node.

In one embodiment, the $P_{1,offset}$ is configured to the first node U6 by the second node.

In one embodiment, the $P_{1,offset}$ is related to the information of the position of the second node relative to the first node U6.

Embodiment 8

Figure 8:
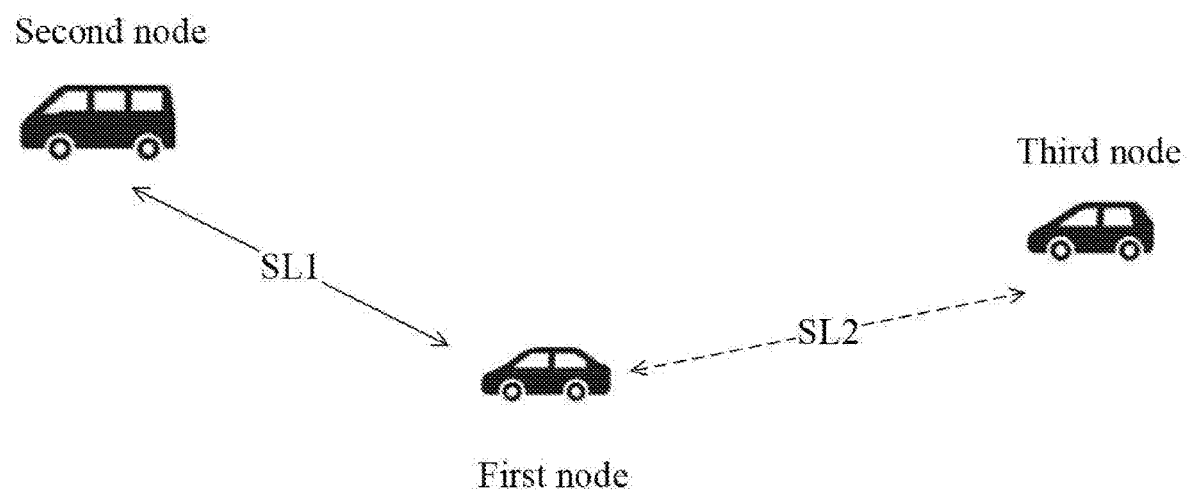
FIG. 8 illustrates a schematic diagram of a first node, a second node and a third node according to one embodiment of the present disclosure.

Embodiment 8 illustrates a schematic diagram of a first node, a second node and a third node, as shown in FIG. 8. In FIG. 8, the first node and the second node constitute a V2X pair, and the first node and the third node constitute another V2X pair, the first node is in sidelink communication with the second node and the third node simultaneously; the first node and the second node correspond to Sidelink-1 (SL1), while the first node and the third node correspond to Sidelink-2 (SL2).

In one embodiment, the first node, the second node and the third node belong to a same terminal group; the second node is the group head for the terminal group, or the second node is the group manager for the terminal group.

In one embodiment, the second node is an RSU.

In one embodiment, the first node, the second node and the third node are served by cellular network.

In one embodiment, the first node and the second node are both served by a base station.

In one embodiment, the first offset value in the present disclosure is designed to reduce interference with SL1 from a wireless transmission on SL2.

Embodiment 9

Figure 9:
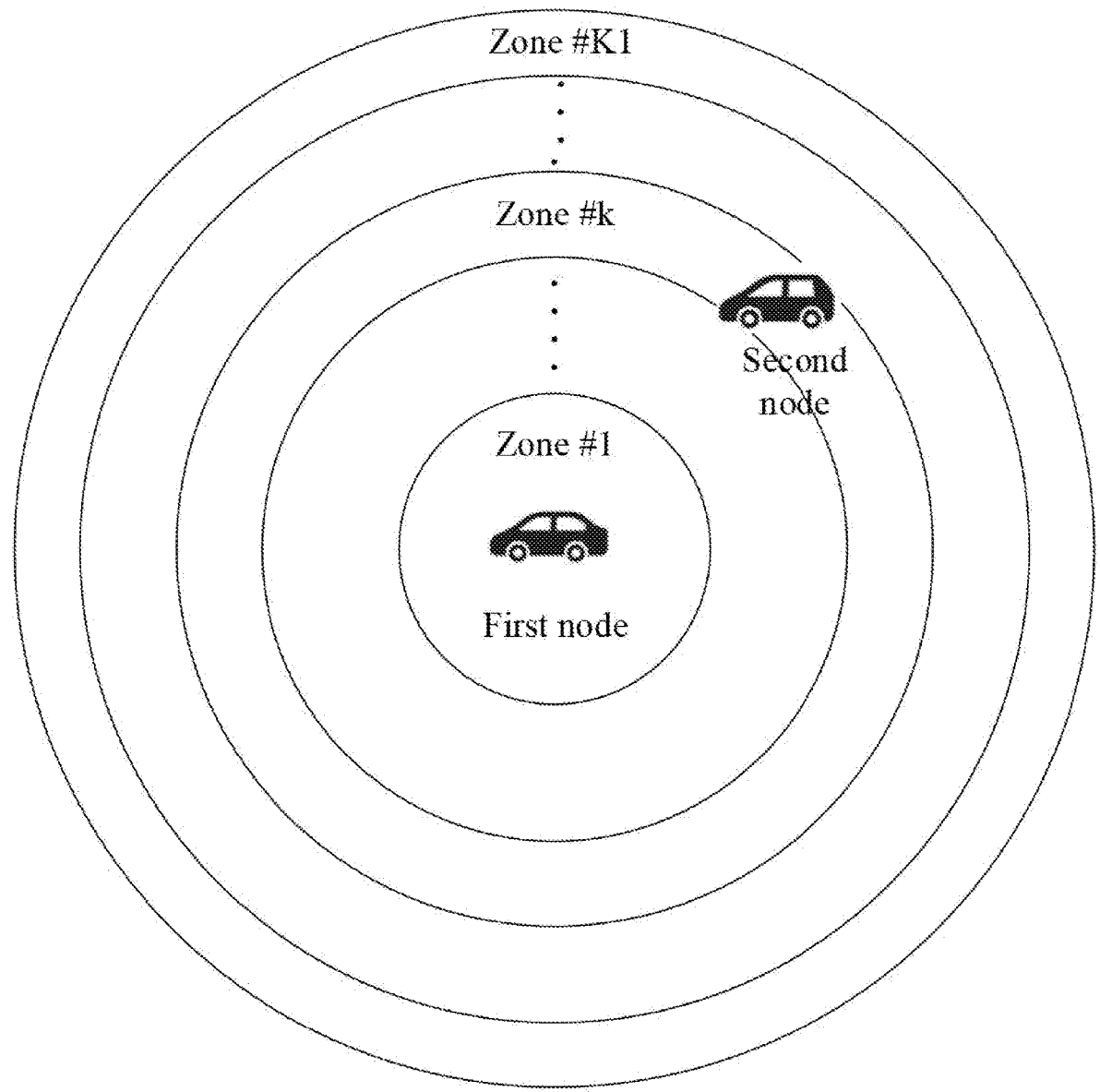
FIG. 9 illustrates a schematic diagram of K1 distance zones according to one embodiment of the present disclosure.

Embodiment 9 illustrates a schematic diagram of K1 distance zones, as shown in FIG. 9. In FIG. 9, the K1 distance zones range from zone #1 to zone #K1, respectively, and the zone #1 through interval #K1 respectively correspond to K1 power parameters; K1 annular zones illustrated in FIG. 9 correspond to zone #1 through zone #K1. The center of the K1 annular zones is where the first node in the present disclosure is located, and the second node in the present disclosure is located within zone #k among zones #1 through #K1, k is an integer no less than 1 and no greater than K1; the zone #k is used for determining the first power parameter in the present disclosure out of the K1 power parameters, the first power parameter is used for determining a transmitting power value of the first radio signal in the present disclosure transmitted from the first node to the second node.

In one embodiment, zone #i is any one of the zones #1 through #K1, a distance between the zone #i and the first node is between X(k) and X(k+1), wherein the X(k) and the X(k+1) are both measured in meters, and the X(k+1) is greater than the X(k).

In one embodiment, zone #i is any one of the zones #1 through #K1, a pathloss between the zone #i and the first node is between Y(k) and Y(k+1), wherein the Y(k) and the Y(k+1) are both measured in dB, and the Y(k+1) is greater than the Y(k).

Embodiment 10

Figure 10:
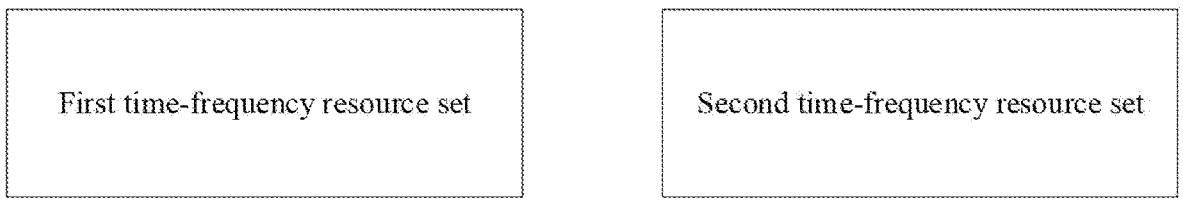
FIG. 10 illustrates a schematic diagram of a first time-frequency resource set and a second time-frequency resource set according to one embodiment of the present disclosure.

Embodiment 10 illustrates a schematic diagram of a first time-frequency resource set and a second time-frequency resource set, as shown in FIG. 10. In FIG. 10, the first time-frequency resource set occupies a positive integer number of Resource Elements (REs), and the second time-frequency resource set occupies a positive integer number of REs. REs occupied by the first radio signal in the present disclosure belong to the first time-frequency resource set, while REs occupied by the second radio signal in the present disclosure belong to the second time-frequency resource set.

In one embodiment, REs occupied by the first time-frequency resource set and REs occupied by the second time-frequency resource set are orthogonal in time-frequency domain.

In one embodiment, the first node in the present disclosure employs power parameter #i of the K1 power parameters in the present disclosure when transmitting a radio signal with time-frequency resources in the first time-frequency resource set, and the first node in the present disclosure employs power parameter #j of the K1 power parameters in the present disclosure when transmitting a radio signal with time-frequency resources in the second time-frequency resource set, the i and the j are different.

In one subembodiment, the power parameter #i and the power parameter #j respectively correspond to different zones in Embodiment 9.

Embodiment 11

Figure 11:
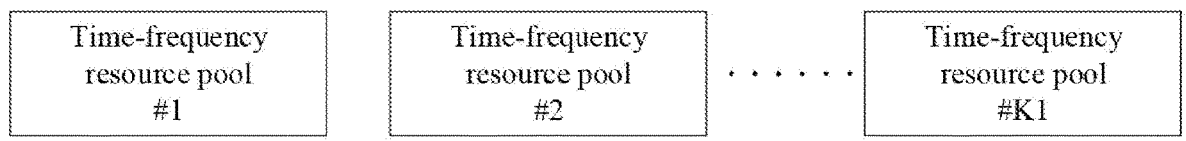
FIG. 11 illustrates a schematic diagram of K1 time-frequency resource pools according to one embodiment of the present disclosure.

Embodiment 11 illustrates a schematic diagram of K1 time-frequency resource pools, as shown in FIG. 11. In FIG. 11, any of the K1 time-frequency resource pools comprises a positive integer number of REs, the K1 time-frequency resource pools respectively correspond to K1 distance zones in Embodiment 9.

In one embodiment, time-frequency resources occupied by any two of the K1 time-frequency resource pools are orthogonal.

In one embodiment, the first time-frequency resource set and the second time-frequency resource set in Embodiment 10 belong to two different time-frequency resource pools of the K1 time-frequency resource pools.

In one embodiment, the phrase that the K1 time-frequency resource pools respectively correspond to K1 distance zones in Embodiment 9 means that: a given terminal is located within a given zone of the K1 distance zones, the given zone corresponds to a given time-frequency resource pool of the K1 time-frequency resource pools, the first node transmits a sidelink radio signal to the given terminal, time-frequency resources occupied by the sidelink radio signal belong to the given time-frequency resource pool.

Embodiment 12

Figure 12:
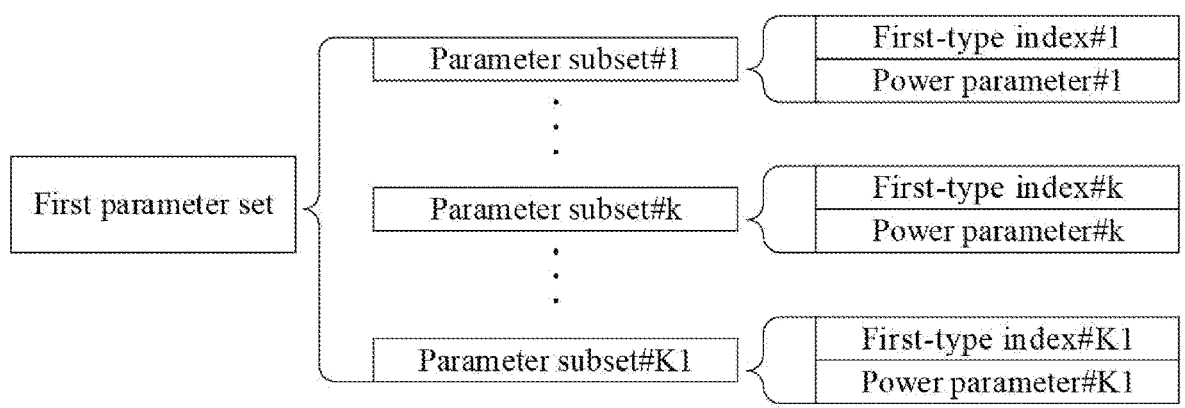
FIG. 12 illustrates a schematic diagram of first information according to one embodiment of the present disclosure.

Embodiment 12 illustrates a schematic diagram of first information, as shown in FIG. 12. In FIG. 12, the first information comprises a first parameter set, the first parameter set comprises K1 parameter subsets, the K1 parameter subsets respectively comprise K1 first-type indices and K1 power parameters; the K1 parameter subsets respectively correspond to parameter subsets #1 through #K1 in FIG. 12, the K1 first-type indices respectively correspond to first-type indices #1 through #K1 in FIG. 12, and the K1 power parameters respectively correspond to power parameters #1 through #K1 in FIG. 12, k is a positive integer no less than 1 and no greater than K1.

In one embodiment, the K1 first-type indices respectively correspond to the K1 power parameters.

In one embodiment, any two of the K1 first-type indices are unequal.

In one embodiment, the first parameter set is cell-specific.

In one embodiment, the first parameter set is specific to a terminal group.

Embodiment 13

Figure 13:
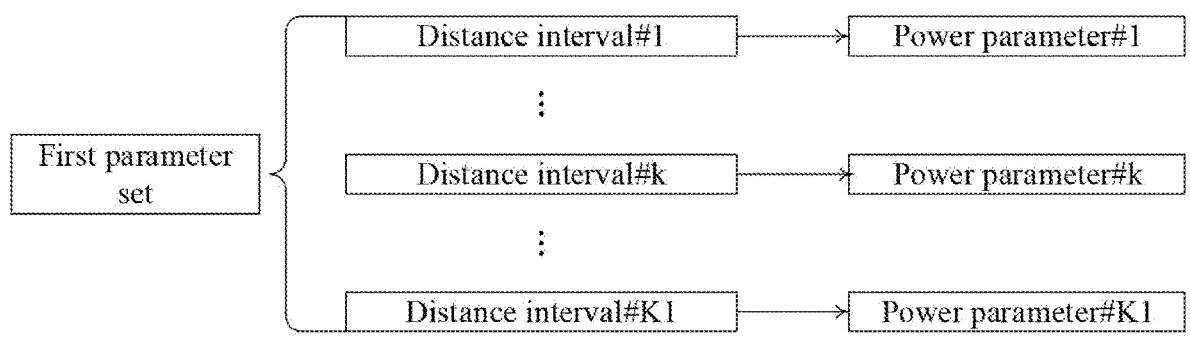
FIG. 13 illustrates another schematic diagram of first information according to one embodiment of the present disclosure.

Embodiment 13 illustrates another schematic diagram of first information, as shown in FIG. 13. In FIG. 13, the first information comprises a first parameter set, the first parameter set corresponds to K1 distance zones, the K1 distance zones respectively correspond to K1 power parameters; the K1 distance zones respectively correspond to distance zones #1 through #K1 in FIG. 13, the K1 power parameters respectively correspond to power parameters #1 through #K1 in FIG. 13, k is a positive integer no less than 1 and no greater than K1.

In one embodiment, physical regions respectively corresponding to any two of the K1 distance zones are non-overlapping.

In one embodiment, the first parameter set is cell-specific.

In one embodiment, the first parameter set is specific to a terminal group.

Embodiment 14

Figure 14:
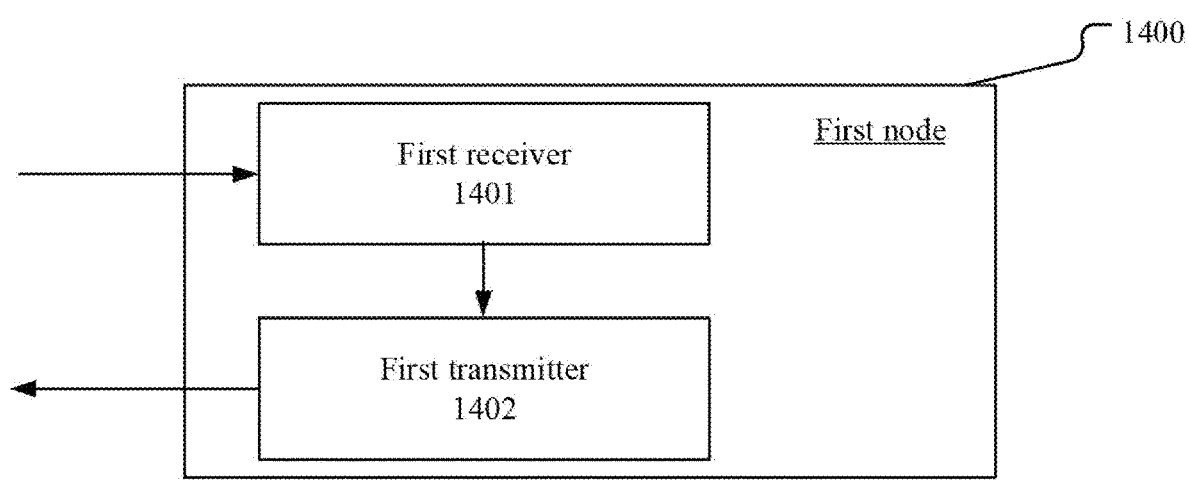
FIG. 14 illustrates a structure block diagram of a first node according to one embodiment of the present disclosure.

Embodiment 14 illustrates a structure block diagram of a first node, as shown in FIG. 14. In FIG. 14, a first node 1400 comprises a first receiver 1401 and a first transmitter 1402:

The first receiver 1401, which receives first information, the first information comprising a first parameter set, the first parameter set comprising K1 power parameters, the K1 being a positive integer greater than 1.

The first transmitter 1402, which transmits a first radio signal.

In Embodiment 14, a transmitting power value of the first radio signal is a first transmitting power value, a first power parameter is one of the K1 power parameters, the first power parameter is used for determining the first transmitting power value; a receiver of the first radio signal includes a second node, information of a position of the second node relative to the first node is used for determining the first power parameter out of the K1 power parameters.

In one embodiment, the first receiver 1401 receives a second radio signal; the second radio signal is used for determining a first coefficient, the first coefficient is used for determining the first target power value; the first target power value is used for determining the first transmitting power value; the first target power value is linear with the first power parameter, or the first target power value is linear with a product of the first power parameter and the first coefficient.

In one embodiment, the first receiver 1401 receives a third radio signal, and the first transmitter 1402 transmits a fourth radio signal; a transmitter of the third radio signal is a terminal other than the second node, and a receiver of the fourth radio signal includes the transmitter of the third radio signal; the third radio signal is used for determining a second coefficient, a transmitting power value of the fourth radio signal is a second transmitting power value, the second coefficient is used for determining the second transmitting power value; the first information comprises a first offset value, the first offset value and the first power parameter are used for determining the second transmitting power value.

In one embodiment, the K1 power parameters respectively correspond to K1 distance zones, the information of the position of the second node relative to the first node is used for determining a given distance zone out of the K1 distance zones, the given distance zone is used for determining the first power parameter out of the K1 power parameters.

In one embodiment, a transmitter of the third radio signal is a third node, the first offset value is used for determining the second transmitting power value only when information of a position of the third node relative to the first node meets given conditions.

In one embodiment, the first receiver 1401 receives second information; the second node transmits the second information, the second information comprises information relevant to a position of the second node, and the information relevant to the position of the second node is used for determining the information of the position of the second node relative to the first node.

In one embodiment, the first transmitter 1402 transmits third information; the third information comprises first sub-information and second sub-information, the first sub-information is used for indicating the information of the position of the second node relative to the first node, while the second sub-information is used for indicating a first remaining power value, the first remaining power value is related to the information of the position of the second node relative to the first node.

In one embodiment, the first receiver 1401 comprises at least the first four of the antenna 452, the receiver 454, the multi-antenna receiving processor 458, the receiving processor 456 and the controller/processor 459 in Embodiment 4.

In one embodiment, the first transmitter 1402 comprises at least the first four of the antenna 452, the transmitter 454, the multi-antenna transmitting processor 457, the transmitting processor 468 and the controller/processor 459 in Embodiment 4.

Embodiment 15

Figure 15:
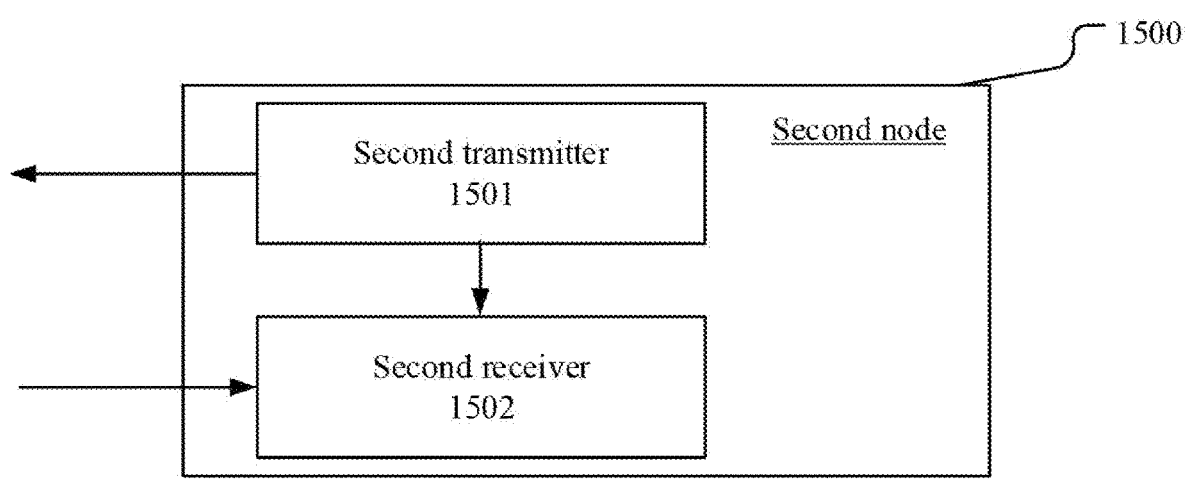
FIG. 15 illustrates a structure block diagram of a second node according to one embodiment of the present disclosure.

Embodiment 15 illustrates a structure block diagram of a second node, as shown in FIG. 15. In FIG. 15, a second node 1500 comprises a second transmitter 1501 and a second transceiver 1502:

The second transmitter 1501, which transmits first information, the first information comprising a first parameter set, the first parameter set comprising K1 power parameters, the K1 being a positive integer greater than 1;

The second receiver 1502, which receives a first radio signal.

In Embodiment 15, a transmitting power value of the first radio signal is a first transmitting power value, a first power parameter is one of the K1 power parameters, the first power parameter is used for determining the first transmitting power value; a transmitter of the first radio signal is a first node, information of a position of the second node relative to the first node is used for determining the first power parameter out of the K1 power parameters.

In one embodiment, the second transmitter 1501 transmits a second radio signal; the second radio signal is used for determining a first coefficient, the first coefficient is used for determining the first target power value; the first target power value is used for determining the first transmitting power value; the first target power value is linear with the first power parameter, or the first target power value is linear with a product of the first power parameter and the first coefficient.

In one embodiment, the K1 power parameters respectively correspond to K1 distance zones, the information of the position of the second node relative to the first node is used for determining a given distance zone out of the K1 distance zones, the given distance zone is used for determining the first power parameter out of the K1 power parameters.

In one embodiment, the second transmitter 1501 transmits second information; the second information comprises information relevant to the position of the second node, and the information relevant to the position of the second node is used for determining information of the position of the second node relative to the first node.

In one embodiment, the second receiver 1502 receives third information; the third information comprises first sub-information and second sub-information, the first sub-information is used for indicating the information of the position of the second node relative to the first node, while the second sub-information is used for indicating a first remaining power value, the first remaining power value is related to the information of the position of the second node relative to the first node.

In one embodiment, the second transmitter 1501 comprises at least the first four of the antenna 420, the transmitter 418, the multi-antenna transmitting processor 471, the transmitting processor 416 and the controller/processor 475 in Embodiment 4.

In one embodiment, the second receiver 1502 comprises at least the first four of the antenna 420, the receiver 418, the multi-antenna receiving processor 472, the receiving processor 470 and the controller/processor 475 in Embodiment 4.

Embodiment 16

Figure 16:
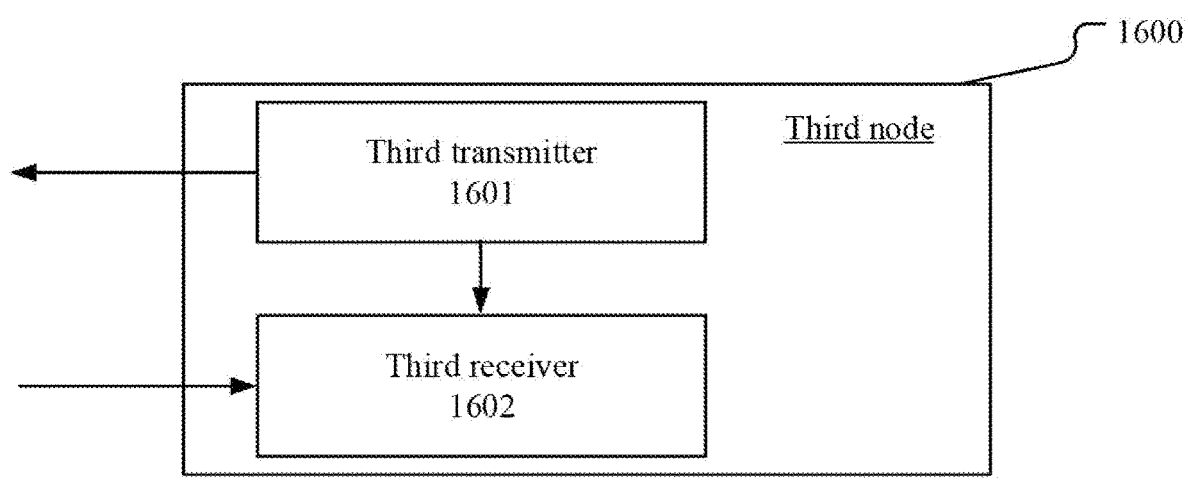
FIG. 16 illustrates a structure block diagram of a third node according to one embodiment of the present disclosure.

Embodiment 16 illustrates a structure block diagram of a third node, as shown in FIG. 16. In FIG. 16, a third node 1600 comprises a third transmitter 1601 and a third receiver 1602:

The third transmitter 1601, which transmits a third radio signal.

The third receiver 1602, which receives a fourth radio signal.

In Embodiment 16, the third radio signal is used for determining a second coefficient, a transmitting power value of the fourth radio signal is a second transmitting power value, the second coefficient is used for determining the second transmitting power value; the first information in the present disclosure comprises a first offset value, the first offset value and the first power parameter in the present disclosure are used for determining the second transmitting power value; a receiver of the third radio signal includes the first node in the present disclosure, and the first node transmits the fourth radio signal.

In one embodiment, the first information in the present disclosure comprises a first parameter set, the first parameter set comprises K1 power parameters, the first power parameter is one of the K1 power parameters, information of a position of the second node in the present disclosure relative to a transmitter of the fourth radio signal is used for determining the first power parameter out of the K1 power parameters.

In one embodiment, the first information in the present disclosure comprises the first offset value, a transmitter of the first information is a node other than the third node.

In one embodiment, the K1 power parameters respectively correspond to K1 distance zones, the information of the position of the second node relative to the transmitter of the fourth radio signal is used for determining a given distance zone out of the K1 distance zones, the given distance zone is used for determining the first power parameter out of the K1 power parameters.

In one embodiment, the first offset value is used for determining the second transmitting power value only when the information of the position of the third node relative to the first node meets given conditions.

In one embodiment, the third transmitter 1601 comprises at least the first four of the antenna 420, the transmitter 418, the multi-antenna transmitting processor 471, the transmitting processor 416 and the controller/processor 475 in Embodiment 4.

In one embodiment, the third receiver 1602 comprises at least the first four of the antenna 420, the receiver 418, the multi-antenna receiving processor 472, the receiving processor 470 and the controller/processor 475 in Embodiment 4.

Embodiment 17

Figure 17:
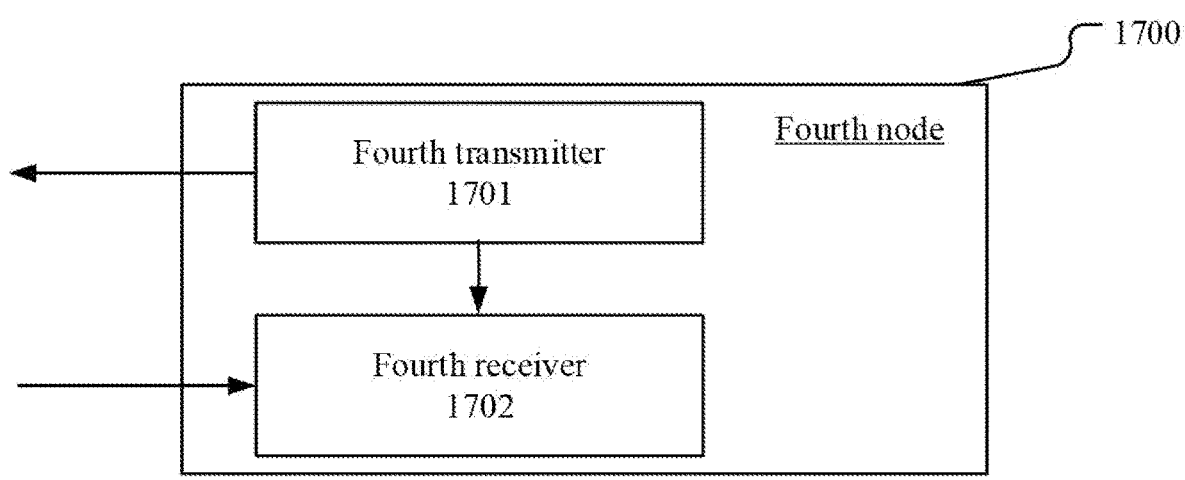
FIG. 17 illustrates a structure block diagram of a fourth node according to one embodiment of the present disclosure.

Embodiment 17 illustrates a structure block diagram of a fourth node, as shown in FIG. 17. In FIG. 17, a fourth node 1700 comprises a fourth transmitter 1701 and a fourth receiver 1702.

The fourth transmitter 1701 transmits first information, the first information comprises a first parameter set, the first parameter set comprising K1 power parameters, the K1 being a positive integer greater than 1.

The fourth receiver 1702 receives third information.

In Embodiment 17, a transmitting power value of the first radio signal is a first transmitting power value, a first power parameter is one of the K1 power parameters, the first power parameter is used for determining the first transmitting power value; a transmitter of the first radio signal is a first node, and a receiver of the first radio signal includes a second node, the information of the position of the second node relative to the first node is used for determining the first power parameter out of the K1 power parameters; the third information comprises first sub-information and second sub-information, the first sub-information is used for indicating the information of the position of the second node relative to the first node, while the second sub-information is used for indicating a first remaining power value, the first remaining power value is related to the information of the position of the second node relative to the first node.

In one embodiment, the fourth node is an attached base station for a serving cell of the first node in the present disclosure.

In one embodiment, the first information in the present disclosure comprises the first offset value, the first offset value and the first power parameter are used for determining a second transmitting power value; a transmitting power value of a fourth radio signal when transmitted by the first node is the second transmitting power value, a receiver of the fourth radio signal is the third node.

In one embodiment, the first offset value is used for determining the second transmitting power value only when the information of the position of the third node relative to the first node meets given conditions.

In one embodiment, the K1 power parameters respectively correspond to K1 distance zones, the information of the position of the second node relative to the first node is used for determining a given distance zone out of the K1 distance zones, the given distance zone is used for determining the first power parameter out of the K1 power parameters.

In one embodiment, the fourth transmitter 1701 comprises at least the first four of the antenna 420, the transmitter 418, the multi-antenna transmitting processor 471, the transmitting processor 416 and the controller/processor 475 in Embodiment 4.

In one embodiment, the fourth receiver 1702 comprises at least the first four of the antenna 420, the receiver 418, the multi-antenna receiving processor 472, the receiving processor 470 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node and the second node in the present disclosure include but are not limited to mobile phones, tablet computers, notebooks, network cards, low-consumption equipment, enhanced MTC (eMTC)

equipment, NB-IOT terminals, vehicle-mounted equipment, vehicles, automobiles, RSU, aircrafts, airplanes, unmanned aerial vehicles, telecontrolled aircrafts, etc. The base station in the present disclosure includes but is not limited to macro-cellular base stations, micro-cellular base stations, home base stations, relay base station, eNB, gNB, Transmitter Receiver Point (TRP), relay satellites, satellite base station, aerial base station, RSU and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node for wireless communication, comprising:
   receiving first information, the first information comprising a first parameter set, the first parameter set comprising K1 power parameters, the K1 being a positive integer greater than 1;
   receiving second information
   receiving a second radio signal; and
   transmitting a first radio signal;
   wherein a transmitting power value of the first radio signal is a first transmitting power value, a first power parameter is one of the K1 power parameters, the first power parameter is used for determining the first transmitting power value; a receiver of the first radio signal includes a second node, information of a position of the second node relative to the first node is used for determining the first power parameter out of the K1 power parameters; the second radio signal is used for determining a first coefficient, the first coefficient is used for determining a first target power value;
   the first coefficient is a pathloss from the second node to the first node;
   the first target power value is used for determining the first transmitting power value;
   the first target power value is linear with a product of the first power parameter and the first coefficient;
   the first power parameter is a real number greater than 0 and no greater than 1;
   the second node transmits the second information, the second information comprises information relevant to a position of the second node, and
   the information relevant to the position of the second node is used for determining the information of the position of the second node relative to the first node.

2. The method in the first node according to claim 1, comprising:
   receiving a third radio signal; and
   transmitting a fourth radio signal;
   wherein a transmitter of the third radio signal is a terminal other than the second node, and a receiver of the fourth radio signal includes the transmitter of the third radio signal; the third radio signal is used for determining a second coefficient, a transmitting power value of the fourth radio signal is a second transmitting power value, the second coefficient is used for determining the second transmitting power value; the first information comprises a first offset value, the first offset value and the first power parameter are used for determining the second transmitting power value.

3. The method in the first node according to claim 2, wherein a transmitter of the third radio signal is a third node, the first offset is used for determining the second transmitting power value only when information of a position of the third node relative to the first node meets given conditions.

4. The method in the first node according to claim 1, wherein the K1 power parameters respectively correspond to K1 distance intervals, the information of the position of the second node relative to the first node is used for determining a given distance interval out of the K1 distance intervals, the given distance interval is used for determining the first power parameter out of the K1 power parameters; the K1 distance zones respectively correspond to K1 first-type indices; the K1 power parameters are respectively K1 first-type compensation factors, the given distance zone is used for determining a first index out of the K1 first-type indices, the first index is used for determining a first compensation factor out of the K1 first-type compensation factors; a product of the first compensation factor and the first coefficient is used for determining the first transmitting power value; the first compensation factor is equal to the first power parameter in the present disclosure.

5. The method in the first node according to claim 1, comprising:
   transmitting third information;
   wherein the third information comprises first sub-information and second sub-information, the first sub-information is used for indicating the information of the position of the second node relative to the first node, while the second sub-information is used for indicating a first remaining power, the first remaining power value is related to the information of the position of the second node relative to the first node.

6. A method in a second node for wireless communication, comprising:
   transmitting first information, the first information comprising a first parameter set, the first parameter set comprising K1 power parameters, the K1 being a positive integer greater than 1;
   transmitting second information
   transmitting a second radio signal; and
   receiving a first radio signal;
   wherein a transmitting power value of the first radio signal is a first transmitting power value, a first power parameter is one of the K1 power parameters, the first power parameter is used for determining the first transmitting power value; a transmitter of the first radio signal is a first node, information of a position of the second node relative to the first node is used for determining the first power parameter out of the K1 power parameters; the second radio signal is used for determining a first coefficient, the first coefficient is used for determining a first target power value; the first coefficient is a pathloss from the second node to the first node; the first target power value is used for determining the first transmitting power value; the first target power value is linear with a product of the first power parameter and the first coefficient the first power parameter is a real number greater than 0 and no greater than 1; the second information comprises information relevant to a position of the second node, and the information relevant to the position of the second node is used for determining the information of the position of the second node relative to the first node.

7. The method in the second node according to claim 6, wherein the K1 power parameters respectively correspond to K1 distance intervals, the information of the position of the second node relative to the first node is used for determining a given distance interval out of the K1 distance intervals, the given distance interval is used for determining the first power parameter out of the K1 power parameters; the K1 distance zones respectively correspond to K1 first-type indices; the K1 power parameters are respectively K1 first-type compensation factors, the given distance zone is used for determining a first index out of the K1 first-type indices, the first index is used for determining a first compensation factor out of the K1 first-type compensation factors; a product of the first compensation factor and the first coefficient is used for determining the first transmitting power value; the first compensation factor is equal to the first power parameter in the present disclosure.

8. The method in the second node according to claim 6, comprising:
   receiving third information;
   wherein the third information comprises first sub-information and second sub-information, the first sub-information is used for indicating the information of the position of the second node relative to the first node, while the second sub-information is used for indicating a first remaining power, the first remaining power value is related to the information of the position of the second node relative to the first node.

9. A first node for wireless communication, comprising:
   a first receiver, which receives first information, the first information comprising a first parameter set, the first parameter set comprising K1 power parameters, the K1 being a positive integer greater than 1, receives second information, receives a second radio signal; and
   a first transmitter, which transmits a first radio signal;
   wherein a transmitting power value of the first radio signal is a first transmitting power value, a first power parameter is one of the K1 power parameters, the first power parameter is used for determining the first transmitting power value; a receiver of the first radio signal includes a second node, information of a position of the second node relative to the first node is used for determining the first power parameter out of the K1 power parameters; the second radio signal is used for determining a first coefficient, the first coefficient is used for determining a first target power value; the first coefficient is a pathloss from the second node to the first node; the first target power value is used for determining the first transmitting power value; the first target power value is linear with a product of the first power parameter and the first coefficient the first power parameter is a real number greater than 0 and no greater than 1; the second node transmits the second information, the second information comprises information relevant to a position of the second node, and the information relevant to the position of the second node is used for determining the information of the position of the second node relative to the first node.

10. The first node according to claim 9, wherein the first receiver receives a third radio signal, and the first transmitter transmits a fourth radio signal; a transmitter of the third radio signal is a terminal other than the second node, and a receiver of the fourth radio signal includes the transmitter of the third radio signal; the third radio signal is used for determining a second coefficient, a transmitting power value of the fourth radio signal is a second transmitting power value, the second coefficient is used for determining the second transmitting power value; the first information comprises a first offset value, the first offset value and the first power parameter are used for determining the second transmitting power value.

11. The first node according to claim 10, wherein a transmitter of the third radio signal is a third node, the first offset is used for determining the second transmitting power value only when information of a position of the third node relative to the first node meets given conditions.

12. The first node according to claim 9, wherein the K1 power parameters respectively correspond to K1 distance intervals, the information of the position of the second node relative to the first node is used for determining a given distance interval out of the K1 distance intervals, the given distance interval is used for determining the first power parameter out of the K1 power parameters; the K1 distance zones respectively correspond to K1 first-type indices; the K1 power parameters are respectively K1 first-type compensation factors, the given distance zone is used for determining a first index out of the K1 first-type indices, the first index is used for determining a first compensation factor out of the K1 first-type compensation factors; a product of the first compensation factor and the first coefficient is used for determining the first transmitting power value; the first compensation factor is equal to the first power parameter in the present disclosure.

13. The first node according to claim 9, wherein the first receiver receives second information; the second node transmits the second information, the second information comprises information relevant to a position of the second node, and the information relevant to the position of the second node is used for determining the information of the position of the second node relative to the first node;
   the first transmitter transmits third information; the third information comprises first sub-information and second sub-information, the first sub-information is used for indicating the information of the position of the second node relative to the first node, while the second sub-information is used for indicating a first remaining power, the first remaining power value is related to the information of the position of the second node relative to the first node.

14. A second node for wireless communication, comprising:
   a second transmitter, which transmits first information, the first information comprising a first parameter set, the first parameter set comprising K1 power parameters, the K1 being a positive integer greater than 1; transmits second information; transmits a second radio signal; and
   a second receiver, which receives a first radio signal;
   wherein a transmitting power value of the first radio signal is a first transmitting power value, a first power parameter is one of the K1 power parameters, the first power parameter is used for determining the first transmitting power value; a transmitter of the first radio signal is a first node, information of a position of the second node relative to the first node is used for determining the first power parameter out of the K1 power parameters; the second radio signal is used for determining a first coefficient, the first coefficient is used for determining a first target power value; the first coefficient is a pathloss from the second node to the first node; the first target power value is used for determining the first transmitting power value; the first target power value is linear with a product of the first power parameter and the first coefficient the first power parameter is a real number greater than 0 and no greater than 1; the second node transmits the second information, the second information comprises information relevant to a position of the second node, and the information relevant to the position of the second node is used for determining the information of the position of the second node relative to the first node.

15. The second node according to claim 14, wherein the K1 power parameters respectively correspond to K1 distance intervals, the information of the position of the second node relative to the first node is used for determining a given distance interval out of the K1 distance intervals, the given distance interval is used for determining the first power parameter out of the K1 power parameters; the K1 distance zones respectively correspond to K1 first-type indices; the K1 power parameters are respectively K1 first-type compensation factors, the given distance zone is used for determining a first index out of the K1 first-type indices, the first index is used for determining a first compensation factor out of the K1 first-type compensation factors; a product of the first compensation factor and the first coefficient is used for determining the first transmitting power value; the first compensation factor is equal to the first power parameter in the present disclosure.

16. The second node according to claim 14, wherein the second transmitter transmits second information; the second information comprises information relevant to a position of the second node, and the information relevant to the position of the second node is used for determining the information of the position of the second node relative to the first node;

the second receiver receives third information; the third information comprises first sub-information and second sub-information, the first sub-information is used for indicating the information of the position of the second node relative to the first node, while the second sub-information is used for indicating a first remaining power, the first remaining power value is related to the information of the position of the second node relative to the first node.

* * * * *